(12) United States Patent
Yamada

(10) Patent No.: US 10,509,610 B2
(45) Date of Patent: Dec. 17, 2019

(54) SYSTEMS, METHODS AND APPARATUSES FOR CONTROLLING REPORTING VIA PUSH NOTIFICATION

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/047,259

(22) Filed: Jul. 27, 2018

(65) Prior Publication Data

US 2019/0034140 A1 Jan. 31, 2019

(30) Foreign Application Priority Data

Jul. 31, 2017 (JP) .................... 2017-147920

(51) Int. Cl.
*G06F 3/12* (2006.01)
*H04L 12/26* (2006.01)
*H04L 29/08* (2006.01)

(52) U.S. Cl.
CPC .......... *G06F 3/1259* (2013.01); *G06F 3/1207* (2013.01); *G06F 3/1229* (2013.01); *G06F 3/1292* (2013.01); *H04L 43/065* (2013.01); *H04L 43/0817* (2013.01); *G06F 3/1288* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2004/0205262 A1* | 10/2004 | Ikeno | ................. | G03G 15/5079 710/15 |
| 2015/0156348 A1* | 6/2015 | Kittaka | ............. | H04N 1/00307 358/1.14 |
| 2015/0199656 A1* | 7/2015 | Carey | .................... | G06Q 10/20 358/1.15 |

FOREIGN PATENT DOCUMENTS

JP 2015-108940 A 6/2015

* cited by examiner

*Primary Examiner* — Andrew H Lam
(74) *Attorney, Agent, or Firm* — Workman Nydegger

(57) ABSTRACT

The server system that collects operation information on a printer through a network includes a communication unit that transmits report information for the operation information, to a terminal apparatus, and a processor that performs communication control. The processor performs control that transmits the report information that is based on a report setting for every terminal apparatus.

9 Claims, 14 Drawing Sheets

FIG. 6

| TYPE | ADDRESS | OPERATION INFORMATION |
|---|---|---|
| ELAPSED TIME FROM POWERING-OFF | a1 | v1 |
| AMOUNT OF CONSUMED Y INK | a2 | v2 |
| AMOUNT OF CONSUMED M INK | a3 | v3 |
| AMOUNT OF CONSUMED C INK | a4 | v4 |
| AMOUNT OF CONSUMED K INK | a5 | v5 |
| ACCUMULATION NUMBER OF ROTATIONS OF ROLLER | a6 | v6 |
| ⋮ | ⋮ | ⋮ |

FIG. 7

| ACQUISITION DATE | PRINTER IDENTIFICATION INFORMATION | OPERATION INFORMATION |
|---|---|---|
| t1 | id1 | ... |
| t2 | id1 | ... |
| t3 | id3 | ... |
| t4 | id2 | ... |
| t5 | id5 | ... |
| t6 | id2 | ... |
| ⋮ | ⋮ | ⋮ |

FIG. 9

| TYPE | VALUE | EVENT |
|---|---|---|
| STATUS INFORMATION | ANY ONE OF PRINTING IN PROCESS, BEING ON STANDBY, WARNING IN PROGRESS, AND BEING IN ERROR | CHANGE IN STATUS |
| REMAINING-TIME INFORMATION | TIME AND MINUTES (EXAMPLE, ONE HOUR 45 MINUTES) | CHANGE IN REMAINING TIME |
| QUANTITY OF CONSUMED CONSUMABLE MATERIALS REMAINING QUANTITY OF CONSUMABLE MATERIALS | %, m (EXAMPLE, 60%, 75 m) | CONSUMPTION PRESCRIBED QUANTITY |
| JOB NAME | EXECUTABLE-FILE NAME (EXAMPLE, Sample_image.pdf) | STARTING OF NEW JOB |

FIG. 12

PLEASE DESIGNATE DAY OF THE WEEK ON
WHICH NOTIFICATION WILL BE MADE

☑ MONDAY  ☑ TUESDAY  ☑ WEDNESDAY

☑ THURSDAY  ☑ FRIDAY

☐ SATURDAY  ☐ SUNDAY

⎫
⎬ E1
⎭

PLEASE DESIGNATE TIME SPAN DURING WHICH
NOTIFICATION WILL BE MADE

[      ] 🕐  TO  [      ] 🕐

⎫
⎬ E2
⎭

PLEASE DESIGNATE NOTIFICATION TYPE

☑ ERROR    PRINTING STOPS, PRINTER

☑ WARNING  TIME FOR COMPONENT
           REPLACEMENT IS APPROACHED

☐ PRINTING IS ENDED

⎫
⎬ E3
⎭

[ OK ]

| PRINTER IDENTIFICATION INFORMATION | TERMINAL APPARATUS IDENTIFICATION INFORMATION |
|---|---|
| id1 | mobile_id1 |
| id1 | mobile_id2 |
| id2 | mobile_id2 |
| id3 | mobile_id3 |
| id3 | mobile_id4 |
| ⋮ | ⋮ |

| TERMINAL APPARATUS IDENTIFICATION INFORMATION | DAY-OF-THE-WEEK SETTING | TIME SPAN SETTING | EVENT SETTING |
|---|---|---|---|
| mobile_id1 | day_config1 | time_config1 | event_config1 |
| mobile_id2 | day_config2 | time_config2 | event_config2 |
| ⋮ | ⋮ | ⋮ | ⋮ |

SYSTEMS, METHODS AND APPARATUSES FOR CONTROLLING REPORTING VIA PUSH NOTIFICATION

CROSS-REFERENCE TO RELATED APPLICATIONS

The present application claims priority to Japanese Patent Application No. 2017-147920, filed Jul. 31, 2017, which is hereby incorporated by reference in its entirety.

BACKGROUND

1. Technical Field

The present invention relates to a server system, a terminal apparatus, an operation information collection system, a non-transitory computer-readable storage medium, a method of operating the server system, a method of operating the terminal apparatus, and the like.

2. Related Art

In the related art, a server system is known that is connected to a network and collects pieces of operation information on a plurality of pieces of equipment. It is considered that there are also various types of equipment, pieces of operation information on which are targets for collection, and for example, there is production equipment such as a printer.

It is considered that there are many uses of the operation information that is collected by the server system. For example, the server system transmits the collected operation information to a terminal apparatus that is used by a user. When this is done, it is possible that the user checks an operation state of a printer using the terminal apparatus. For example, it is also possible that the user who stays at a place that is located far from the printer monitors the operation state (for example, a state of progress in performing a job) of the printer remotely.

However, in a case where the terminal apparatus that receives a notification (a push notification) from the server system performs reporting (rumbling or the like), a user feels this annoying. In JP-A-2015-108940, a technique is disclosed in which a function of performing display on a screen of a mobile terminal and a type of error information that is transmitted are compared with each other and thus display and non-display of the error information are controlled.

In the techniques in JP-A-2015-108940, in a case where an image processing apparatus (a multifunction machine) that has various functions is operated using the mobile terminal, display control is performed with operation from the mobile terminal according to which of the functions of the multifunction machine is used. More precisely, the display of an error in the technique in JP-A-2015-108940 is limited to being performed when the image processing apparatus is operated using the mobile terminal. Thus, the technique is difficult to apply for real-time reporting (for example, real-time error notification) in a system that collects operation information. Furthermore, in the technique in JP-A-2015-108940, because the display and the non-display are determined depending to a function in use, it is not easy to set in detail whether a notification is important to a user.

SUMMARY

An advantage of some aspects of the invention is to provide a server system, a terminal apparatus, an operation information collection system, a non-transitory computer-readable storage medium, a method of operating the server system, a method of operating the terminal apparatus, and the like, which perform reporting that is based on operation information, in a suitable report mode.

According to an aspect of the invention, there is provided a server system that collects operation information on at least one printer through a network, the system including: a communication unit that transmits report information for the operation information to a terminal apparatus; and a processor that performs communication control by the communication unit, in which the processor performs control that transmits the report information which is based on a report setting for a first terminal apparatus, to the first terminal apparatus, and performs control that transmits the report information which is based on a report setting for a second terminal apparatus that is different from the first terminal apparatus, to the second terminal apparatus.

According to the aspect of the invention, in the server system that collects operation information, the report information for the operation information is transmitted according to the report setting for every terminal apparatus. When this is done, it is possible that the report information is transmitted in a suitable mode in accordance with the terminal apparatus.

Furthermore, in the server system, the report setting may be at least one of a setting of a report time span and a setting specifying which of at least one or more of the printers is a target for report.

When this is done, it is possible that the report information relating to the printer that corresponds to the terminal apparatus is transmitted during a suitable time span and so forth.

Furthermore, in the server system, the report setting may be a setting of a type of event in the printer.

When this is done, it is possible that the report information relating to a suitable type of event is transmitted to the terminal apparatus and so forth.

Furthermore, in the server system, the report setting may be given based on the report setting information that is received from the terminal apparatus.

When this is done, it is possible that the report setting is performed based on the information from the terminal apparatus.

Furthermore, in the server system, the communication unit may transmit information on a report candidate printer that is the printer which is a candidate for a target for report in the terminal apparatus, to the terminal apparatus, and may receive information specifying the printer that is selected, as the target for report in the terminal apparatus, from among the report candidate printers, as the report setting information, from the terminal apparatus.

In this manner, the candidate for the printer that is the target for report is transmitted from the server system side and the printer that is selected from among the candidates in the terminal apparatus is set to as the target for report, and thus it is possible that the report information relating to a suitable printer is transmitted.

Furthermore, in the server system, the processor may update a database that results from associated identification information on the terminal apparatus and the printer that is selected as the target for report with each other, based on the report setting information that is received by the communication unit from the terminal apparatus.

When this is done, the database is updated based on the report setting information, and thus it is possible that the report information is transmitted in a suitable mode.

Furthermore, in the server system, the report setting may be a setting specifying which of at least one or more of the printers is a target for report, and in a case where a report event occurs in the printer that is a target for report, the communication unit may transmit the report information to the terminal apparatus without depending on a time span and a type of event.

When this is done, it is possible that the report information relating to the printer that is selected as the target for report is transmitted from the server system, the control of a time span or the type of event is delegated to the terminal apparatus, and so forth.

Furthermore, in the server system, in a case where among first to N-th jobs that are to be consecutively performed, the N-th job is completed in the printer, the communication unit may transmit the report information to the terminal apparatus.

When this is done, it is possible that, in a case where a plurality of jobs are to be consecutively performed, the report information is transmitted at a suitable timing.

Furthermore, according to another aspect of the invention, there is provided a terminal apparatus that is communicatively connected to a server system that collects operation information on at least one printer, through a network, the terminal apparatus including: a communication unit that receives report information for the operation information through the network; and a processor that performs report control that is based on the report information, in which the processor performs the report control of the report information in a first report mode when a first report setting is applied and performs the report control of the report information in a second report mode that is different from the first report mode, when a second report setting is applied.

In the aspect of the invention, in a server system that collects operation information, in a case where the report information is received from the server system, the reporting is performed in a report mode in accordance with the report setting. When this is done, it is possible that unnecessary reporting is suppressed, the reporting relating to the operation information is performed in a suitable mode, and so forth.

Furthermore, according to still another aspect of the invention, there is provided an operation information collection system including a server system that collects operation information on at least one printer through a network; and a terminal apparatus that is communicatively connected to the server system, in which the server system includes a first communication unit that transmits report information for the operation information to the terminal apparatus, and a first processor that performs communication control of the first communication unit, in which the terminal apparatus includes a second communication unit that receives the report information for the operation information from the server system, and a second processor that performs report control that is the report information, and in which at least one of (1) control by the first processor, which transmits the report information which is based on a report setting for a first terminal apparatus, to the first terminal apparatus and transmits the report information that is based on a report setting for a second terminal apparatus that is different from the first terminal apparatus, to the second terminal apparatus, and (2) control by the second processor, which performs report control of the report information in a first report mode when a first report setting is applied and performs the report control of the report information in a second report mode that is different from the first report mode, when a second report setting is applied, is performed.

Furthermore, according to still another aspect of the invention, there is provided a non-transitory computer-readable storage medium on which a program that causes a terminal apparatus which is communicatively connected to a server system that collects operation information on at least one printer, through a network, is stored, the program causing the terminal apparatus to serve as: a communication unit that receives report information for the operation information through the network, and a processor that performs report control which is based on the report information, in which the processor performs report control of the report information in a first report mode when a first report setting is applied, and performs the report control of the report information in a second report mode that is different from the first report mode, when a second report setting is applied.

Furthermore, according to still another aspect of the invention, there is provided a method of operating a server system that collects operation information on at least one printer through a network, the method including: performing processing that transmits report information for the operation information to a terminal apparatus, and communication control of the report information; performing control that transmits the report information that is based on a report setting for a first terminal apparatus, to the first terminal apparatus; and performing control that transmits the report information which is based on a report setting for a second terminal apparatus that is different from the first terminal apparatus, to the second terminal apparatus.

Furthermore, according to still another aspect of the invention, there is provided a method of operating a terminal apparatus that is communicatively connected to a server system which collects operation information on at least one printer, through a network, the method of operating the terminal apparatus that performs processing which receives report information for the operation information through the network, and report control which is based on the report information, performs the report control of the report information in a first report mode when a first report setting is applied, and performs the report control of the report information in a second report mode that is different from the first report mode, when a second report setting is applied.

BRIEF DESCRIPTION OF THE DRAWINGS

The invention will be described with reference to the accompanying drawings, wherein like numbers reference like elements.

FIG. 6 is an example of a data structure of operation information that is stored in the printer.

FIG. 7 is an example of the data structure of the operation information that is stored in the information processing apparatus or the like.

FIG. 9 is a specific example of first information.

FIG. 12 is an example of the display screen that is used for the report setting.

DESCRIPTION OF EXEMPLARY EMBODIMENTS

The present embodiment will be described below. It is noted that the present embodiment which will be described below does not improperly limit the subject matter of the invention that is stated by a claim. Furthermore, all configurations that will be described in the present embodiment are not limited to being configurational requirements for the invention.

Furthermore, an example in which equipment, operation information on which is a target for collection, is a printer (a printing apparatus) is described below, but it is possible that the equipment, the operation information on which is the target for collection includes other equipment (for example, production equipment other than the printer).

1. Operation Information Collection System

Figure 1:
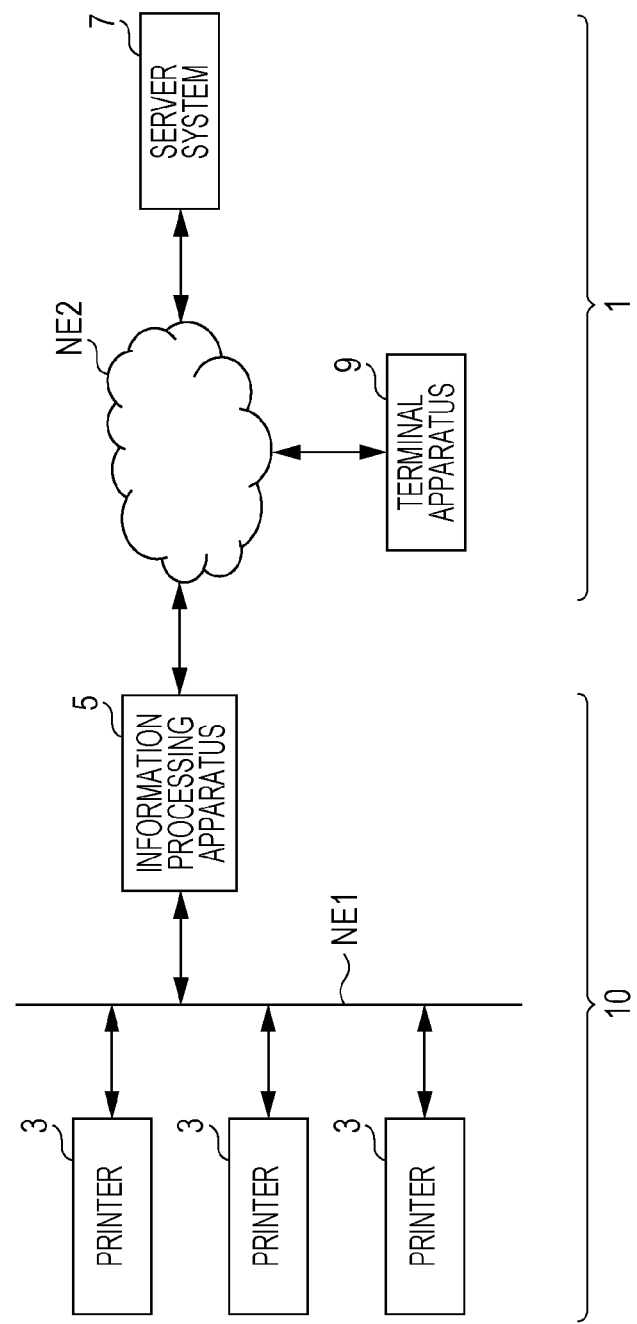
FIG. 1 is a configurational example of an operation information collection system.

FIG. 1 is a diagram that schematically illustrates an example of an operation information collection system according to the invention. The operation information collection system 1 includes a server system 7 that collects operation information on a printer 3 through an information processing apparatus 5, and the terminal apparatus 9. The server system 7 transmits the collected operation information to the terminal apparatus 9. It is noted that all pieces of operation information, which are collected by the server system 7, do not need to be pieces of information that are targets for transmission to the terminal apparatus 9. For example, the server system 7 may transmit information that results from extracting a portion of the operation information, or information that results from process processing, such as statistical processing, on the operation information, to the terminal apparatus 9. The terminal apparatus 9 displays the information, which is received from the server system 7, on the display unit, or performs reporting by making a rumbling sound or the like.

However, a system that includes the operation information collection system 1 is not limited to a configuration in FIG. 1, and various modifications are possible such as omission of one or several constituent elements in the configuration and addition of other constituent elements. For example, the information processing apparatus 5 is omitted from FIG. 1, and each printer 3 may be connected directly to a network NE2 (the Internet).

As illustrated in FIG. 1, a plurality of printers 3 and the information processing apparatus 5 are connected to the network NE1, and possibly communicate bidirectionally with each other through the network NE1. Furthermore, the information processing apparatus 5 and the server system 7 are connected to the network NE2, and possibly communicate with each other through the network NE2. Furthermore, the terminal apparatus 9 is also connected to the network NE2, and the server system 7 and the terminal apparatus 9 possibly communicate bidirectionally with each other through the network NE2.

For example, a network NE1 is a local area network (LAN), and the network NE2 is the Internet. However, the LAN or the Internet is one that is illustrated as an example of a communication network, and thus a specific configuration for connecting between the printer 3 and the information processing apparatus 5, between the information processing apparatus 5 and the server system 7, and between the server system 7 and the terminal apparatus 9 is not limited to these.

A system 10 that is configured with the plurality of printers 3 and the LAN, and the information processing apparatus 5 collects the operation information on each printer 3 using the information processing apparatus 5, and transmits the collected pieces of operation information to an external server system 7. The information processing apparatus 5, for example, is an apparatus that is set up within a facility of the same company, and may be a personal computer (PC) or may be a server within a company. It is noted that one system 10 is illustrated in FIG. 1, but that a plurality of system 10 may be connected to the server system 7.

The printer 3 includes a display unit 333, as will be described below with reference to FIG. 2. For this reason, if a user performs a job near the printer 3, and it is possible that the user recognizes a state of the printer by browsing through the operation information that is displayed on the display unit 333. However, it is also considered that the user performs a job at a place distant from the printer 3.

For example, in a small- or middle-scale company (office) for which a small number of employees work, in addition to operating the printer 3, the user needs to perform tasks, such as accounting, sales, and product delivery, and a situation where the user performs a job at a place distant from the printer 3 takes place. For this reason, it is important to set up a system in which an operation state of the printer 3 can be checked using the terminal apparatus 9 that is operated by the user. Specifically, the terminal apparatus 9 receives, display, and reports information that is based on the operation information which is collected by the server system 7, and the user performs remote monitoring of the operation state of the printer 3.

Furthermore, in the case of a comparatively large-scaled office, it is possible that a person is assigned to each printer 3 (each production line). However, a manager who controls a plurality of production lines in general cannot always check the display units 333 of all printers 3. For this reason, in order to suitably know overall progress in performing a job, it is important to display information with the terminal apparatus 9, and in this case, the operation information collection system 1 that is illustrated in FIG. 1 is also useful.

It is noted that one terminal apparatus 9 is illustrated in FIG. 1, but that a plurality of terminal apparatuses 9 may be present. For example, a plurality of users within a company that uses one system 10 may perform the reception and browsing-through of information by terminal apparatuses 9 of the plurality of users.

Furthermore, in a case where a plurality of systems 10 are connected to the server system 7, one or more terminal apparatus 9 may be used for each system 10.

2. Detailed Configurational Example of Each Apparatus

Next, a configurational example of each of the printer 3, the information processing apparatus 5, the server system 7, and the terminal apparatus 9 will be described.

2.1 Printer

Figure 2:
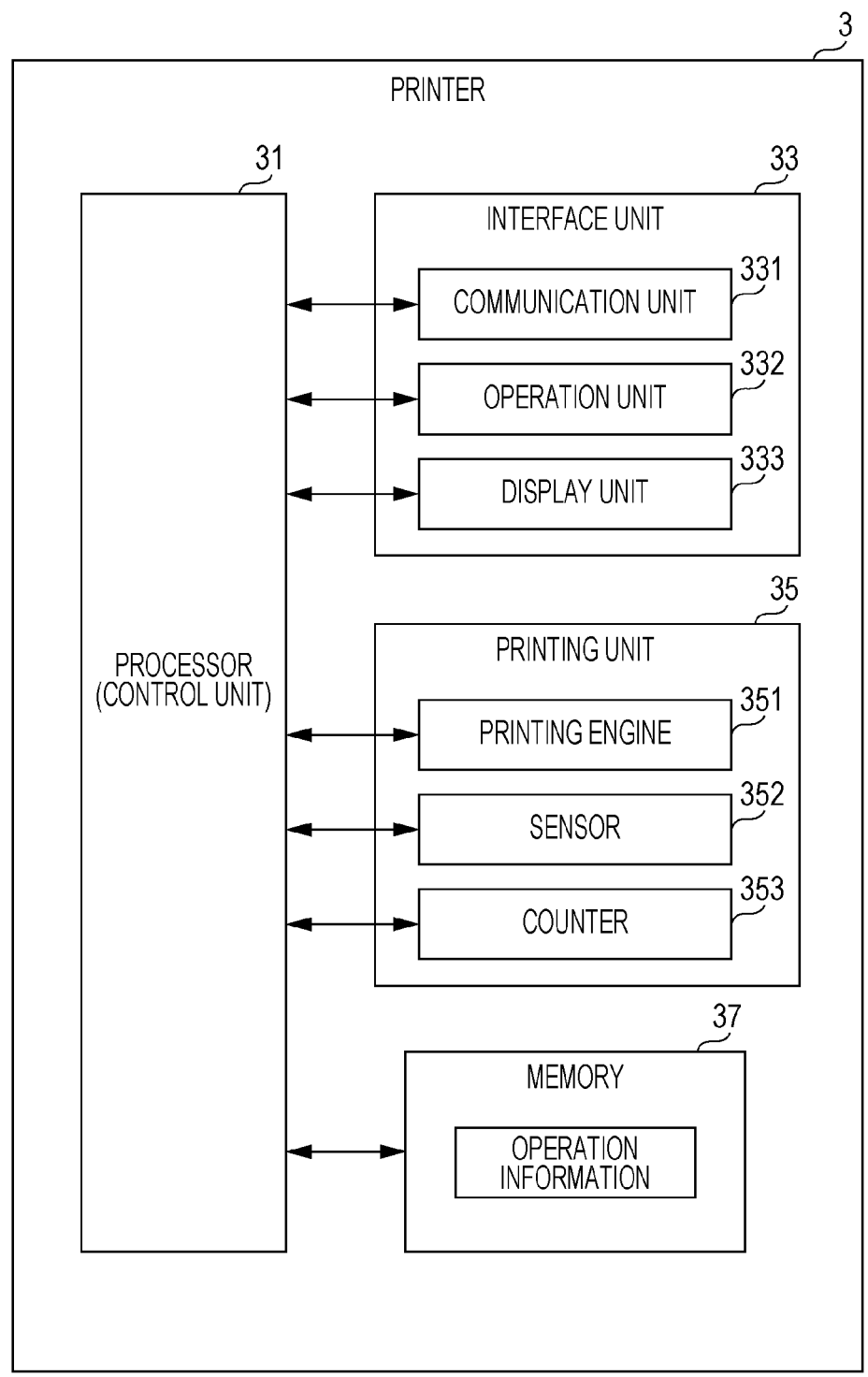
FIG. 2 is a configurational example of a printer.

FIG. 2 is a block diagram illustrating an example of a configuration of the printer 3. The printer 3 includes a processor 31, an interface unit 33, a printing unit 35, and a memory 37. The processor 31 controls in an integrated manner an operation that is performed in the printer 3. A function of the processor 31 can be realized by various processors such as a central processing unit (CPU), hardware such as application specific integrated circuit (ASIC) (a gate array or the like), a program, or the like. The interface unit 33, the printing unit 35, and the memory 37 operate under the control of the processor 31.

The interface unit 33 includes a communication unit 331, an operation unit 332, and the display unit 333. The communication unit 331 is connected to a LAN, and performs communication with the information processing apparatus 5 through the LAN. Furthermore, the operation unit 332 is configured with a button or the like on which an input operation from the user is applied, and the display unit 333 is configured with a display or the like on which various pieces of information relating to the printer 3 are displayed for the user. It is noted that the operation unit 332 and the display unit 333, for example, may be configured to be integrated with a touch panel.

The printing unit 35 includes a printing engine 351, a sensor 352, and a counter 353. The printing engine 351 is mechanically configured to perform printing of an image on a printing medium. The printing engine 351 discharges ink from an ink jet-type discharge head to a winding-type printing medium that is transported with rollers in tow, and thus printers an image on the printing medium. It is noted that a specific configuration of the printing engine 351 is not limited to one that is described here and that the printing engine 351 may perform printing on a paper sheet-type printing medium and may perform printing with a toner using a laser method. The sensor 352 detects various physical quantities associated with an operation state of the printing engine 351, and the counter 353 counts various numerical values that change according to operation of the printing engine 351.

As physical quantity illustrating the operation state of the printing engine 351, for example, a voltage that is applied to an electrical component of the printing engine 351, temperature and humidity within the printing engine 351, a position of the discharge head or the printing medium, and the like. In order to detect these physical quantities, various sensors 352 are provided such a voltage sensor, a temperature and humidity sensor, a position sensor, an acceleration sensor, and the like. Furthermore, as numerical values that change according to the operation of the printing engine 351, for example, there are a time that elapsed after the printing engine 351 is powered on, the accumulation sum of lengths of the printing media on which the printing is performed, an amount of consumed ink (or a remaining amount of ink), the accumulation number of rotations of a mechanical component (for example, a roller that transports the printing medium) and the like. Then, in order to count these numerical values, various counters 353 are provided.

The memory 37 is configured with a storage medium such as a hard disk drive (HDD), a read only memory (ROM), or a random access memory (RAM). Stored in the memory 37 is status information (an error, a warning, or the like) on the printer 3, identification information (a job name) on a job that is performed in the printer 3, information (printing time information or progress information) indicating progress in performing a job, data that is output from the sensor 352 and the counter 353, or the like, as the operation information indicating an operation situation of the printer 3.

2.2 Information Processing Apparatus

Figure 3:
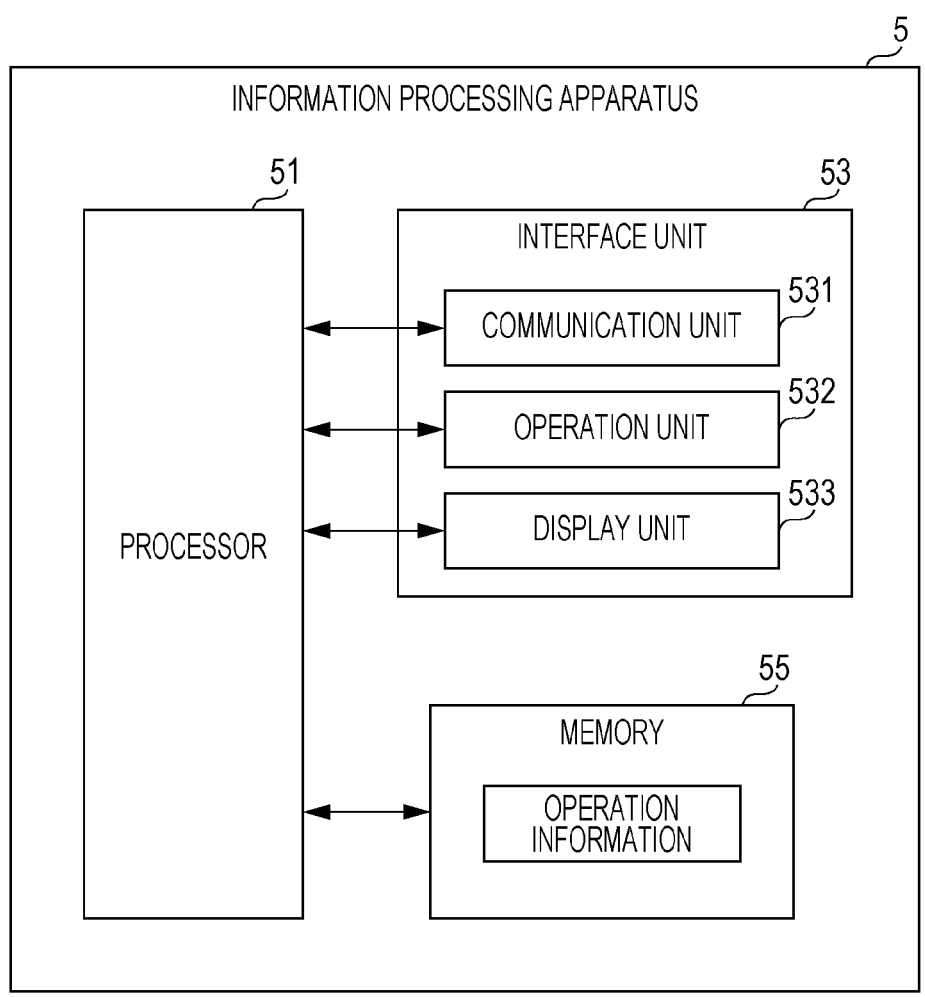
FIG. 3 is a configurational example of an information processing apparatus.

FIG. 3 is a block diagram illustrating an example of a configuration of the information processing apparatus 5. The information processing apparatus 5 includes a processor 51, an interface unit 53, and a memory 55, accesses the memory 37 of each of the plurality of printers 3 to collect the operation information, and performs an information relay operation of transmitting the collected information to the server system 7. The processor 51 is a processor such as a CPU, and performs the information relay operation using the interface unit 53 and the memory 55.

The interface unit 53 includes a communication unit 531, an operation unit 532, and a display unit 533. The communication unit 531 is connected to the LAN and the Internet. The communication unit 531 performs communication with each printer 3 through the LAN and, along with this, performs communication with the server system 7 through the Internet. Furthermore, the operation unit 532 is configured with a mouse, a keyboard, or the like on which the input operation from the user is applied, and the display unit 533 is configured with a display or the like on which various pieces of information are displayed for the user. It is noted that the operation unit 532 and the display unit 533, for example, may be configured to be integrated with a touch panel.

The memory 55 is configured with a storage medium, such as a HDD, a ROM, a RAM. The operation information that is received by the communication unit 531 from the printer 3 is stored in the memory 55. The information processing apparatus 5 is one that acquires pieces of operation information from a plurality of printers 3. Because of this, identification information (a printer ID) on the printer 3, and pieces of information such as the status information described above are stored in the memory 55 in a state of being associated with each other.

2.3 Server System

Figure 4:
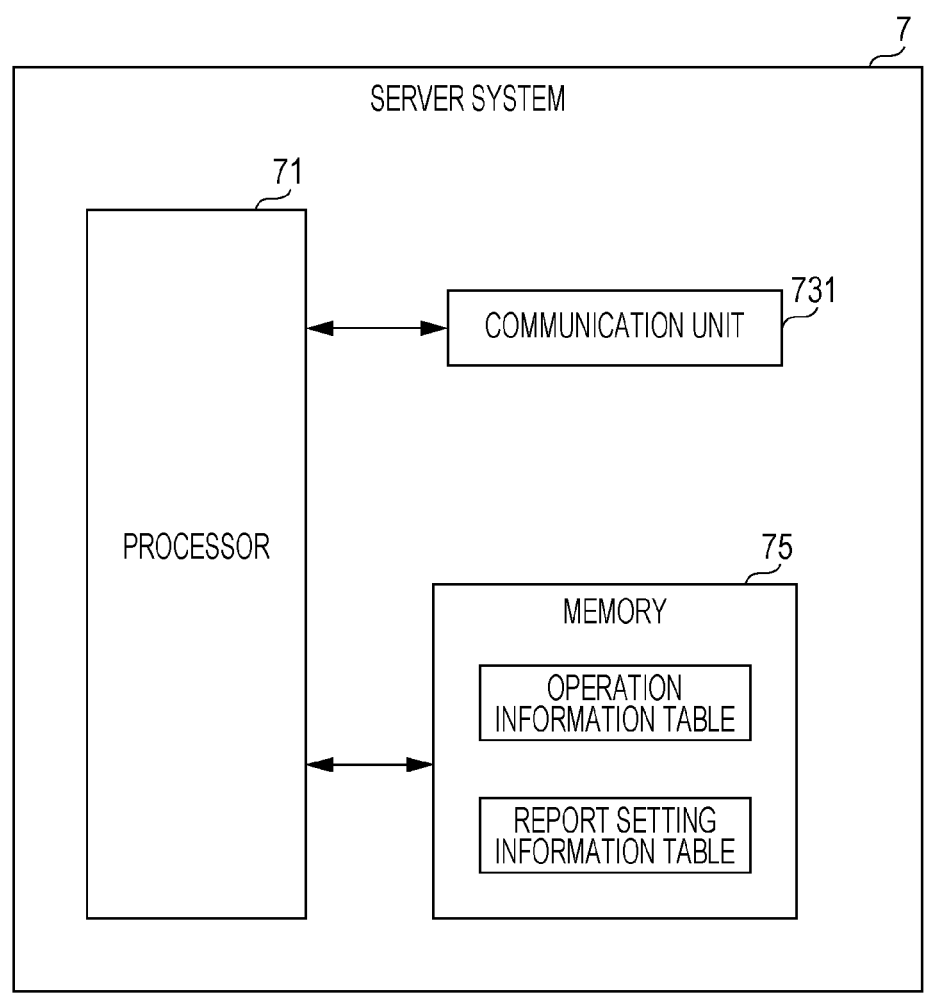
FIG. 4 is a configurational example of a server system.

FIG. 4 is a block diagram illustrating an example of a configuration of the server system 7. The server system 7 includes a processor 71 (a processor), a communication unit 731 (a communication interface), and a memory 75 (a storage device). The server system 7 receives the operation information that is collected by the information processing apparatus 5, and along with this, transmits the operation information to the terminal apparatus 9. A function of the processor 71 can be realized by various processors such as a CPU, hardware such as an ASIC, a program, or the like, and the processor 71 performs a prescribed operation using the communication unit 731 and the memory 75.

The communication unit 731 is connected to the Internet, and the communication with the information processing apparatus 5 or the terminal apparatus 9 is performed through the Internet. It is noted that the server system 7 may include an operation unit or a display unit that is not illustrated. The operation unit is configured with a mouse, a keyboard, or the like on which the input operation from the user is applied, and the display unit is configured with a display or the like on which various pieces of information are displayed for the user. However, the server system 7 may perform management of the server system 7 using an external apparatus (a terminal apparatus for management) without including the operation unit and the display unit. For example, the server system 7 may function as a Web server, in a mode where the server system 7 operates using software (a web browser) which runs on an external apparatus and where various pieces of information are displayed on a display unit of the external apparatus.

The memory 75 is configured with a storage medium, such as a HDD, a ROM, or a RAM. The operation information from the printer 3 and report setting information are stored in the memory 75. The memory 75 may be a database (a relational database in a narrow sense), and an operation information table and a report setting information table are stored in the memory 75. The operation information table is a table in which the operation information is stored. The report setting information table is a table that is used in a case where push notification is performed on the terminal apparatus 9. The push notification here refers to a communication type in which transmission of information from the transmitting side is performed although a request from the receiving side is not present. The push notification from the server system 7 to the terminal apparatus 9 is the transmission of information to the terminal apparatus 9 with the server system 7 being a source.

It is noted that the server system 7 is not limited to one that is realized as one server. For example, the server system 7 may include a database server (the memory 75) in which the operation information table or the like is stored, and an application server (one of the processor 71 and the communication unit 731) that performs transmission and reception of information to and from the terminal apparatus 9. Alternatively, the server system 7 may include a server for load distribution or a server for the push notification to the terminal apparatus 9. Moreover, the database server or the application server, or the like may be realized by an operation of performing distribution to a plurality of servers. Furthermore, each server that makes up the server system 7 may be a server (a virtual server) that is virtualized. In this case, each virtual server may operate on the same server (the same physical server), and may operate on a different physical server. Furthermore, dynamic scheduling (for example, a dynamic change in the number of virtual servers) may be performed on the server system 7 by monitoring a communication load or the like. That is, various modifications to the server system 7 according to the present embodiment are possible in terms of the number of physical servers, the number of virtual servers in a case where the servers are virtualized, a correspondence between a virtual server and a physical server, or the like.

2.4 Terminal Apparatus

Figure 5:
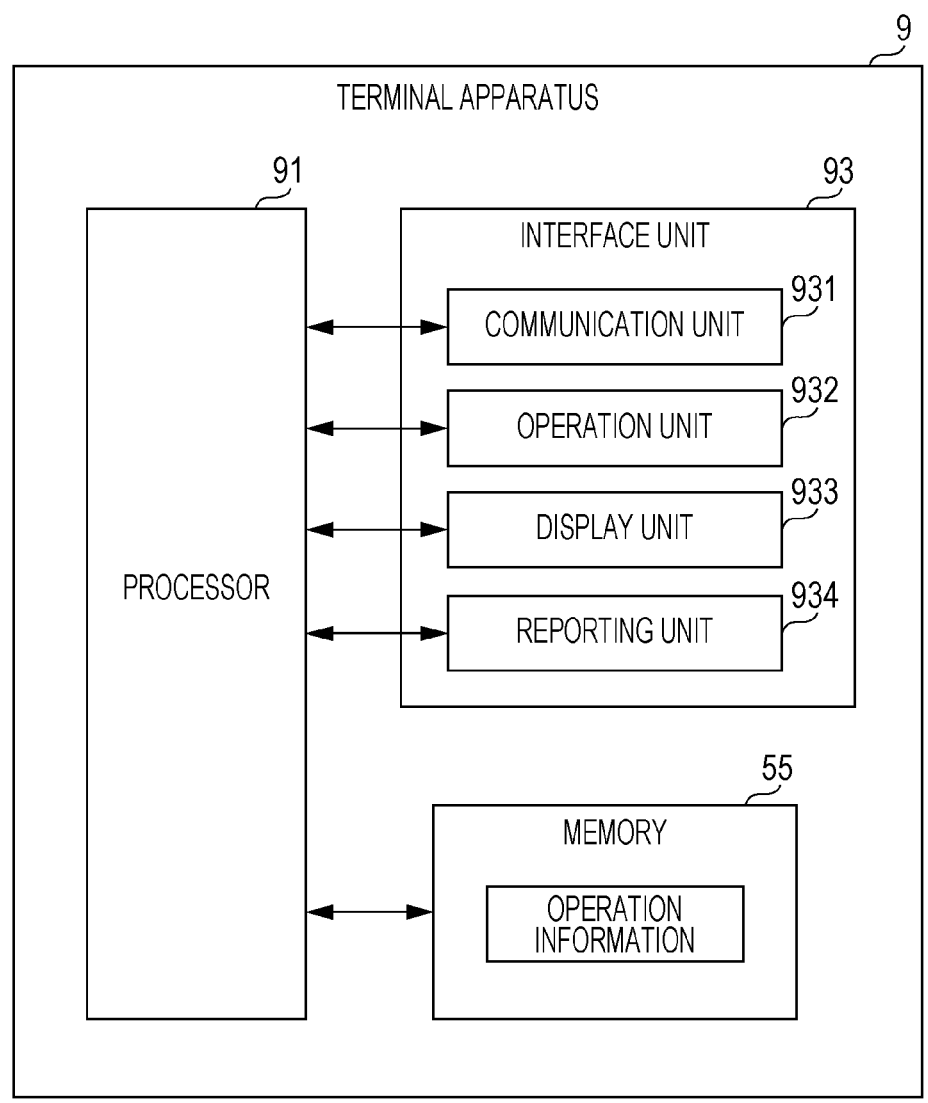
FIG. 5 is a configurational example of a terminal apparatus.

FIG. 5 is a block diagram illustrating an example of a configuration of the terminal apparatus 9. The terminal apparatus 9 includes a processor 91 (a processor), an interface unit 93, and a memory 95 (a storage device) and receives the operation information that is collected by the server system 7. A function of the processor 91 can be realized by various processors such as a CPU, hardware such as an ASIC, a program, or the like.

The interface unit 93 includes a communication unit 931 (a communication interface), an operation unit 932, a display unit 933, and a reporting unit 934. The communication unit 931 is connected to the Internet and performs the communication with the server system 7 through the Internet. The operation unit 932 is configured with a button or the like on which the input operation from the user is applied, and the display unit 933 is configured with a display or the like on which various pieces of information are displayed for the user. It is noted that the operation unit 932 and the display unit 933, for example, may be configured to be integrated with a touch panel. The reporting unit 934 performs reporting to the user. The reporting unit 934 may be, for example, a speaker that performs reporting using audio, may be a vibration (a vibration motor) that performs reporting using vibration, and may be a combination of these.

The memory 95 is configured with a storage medium, such as a HDD, a ROM, or a RAM. Stored in the memory 95 may be software (an application) that performs acquisition processing, display processing, or the like of the operation information from the server system 7. Furthermore, the operation information that is received from the server system 7 is stored in the memory 95.

3. Communication of the Operation Information

Next, a technique of transmitting and receiving the operation information between each of the apparatuses that are illustrated in FIGS. 1 to 5 will be described above.

3.1 Communication Between the Printer and the Information Processing Apparatus

FIG. 6 is a diagram that schematically illustrates an aspect of storage of the operation information in the memory 37 of the printer 3. As illustrated in FIG. 6, in the memory 37, a type of operation information and a memory address are associated with each other, and each piece of operation information is stored in an address that corresponds to a type thereof. In the given specific example, operation information v1 indicating a value of the elapsed time from powering-off is stored in an address a1 that corresponds to a type thereof. However, modifications are possible such as when the operation information and an update time (a time stamp) for the operation information are stored in the memory 37 in a state of being associated with each other.

The processor 31 or the printing unit 35 (the sensor 352 or the counter 353) of the printer 3 periodically (at all times in a narrow sense) monitors the operation state, and in a case where the operation state changes, the operation information on the memory 37 is updated.

The processor 51 (the communication unit 531) of the information processing apparatus 5 performs polling, and periodically acquires the operation information from one or more printers 3 that are connected through the LAN.

If there is a case where, as illustrated in FIG. 6, in the memory 37 of the printer 3, the type and the address of the operation information are associated with each other, the processor 51 accesses the address that corresponds to the operation information which is a target for collection, and collects the operation information that is stored in the address. For example, the processor 51 sets previously-collected information, which undergoes a change, to be a target of collection. Alternatively, based on a mode, a firmware version, or the like of the printer 3, the processor 51 determines the operation information on every printer 3, which is a target for collection.

FIG. 7 is a diagram that schematically illustrates an aspect of storage of the operation information in the memory 55 of the information processing apparatus 5. As illustrated in FIG. 7, the operation information is stored in the memory 55 in a state of being associated with the identification information (an ID or a serial number) on the printer 3 and acquisition time information. It is noted that in the same manner as in the example in FIG. 6, a combination of a type of information ("an amount of consumed Y ink," or the like) and a specific value (the number of times of discharge, a volume, a ratio, or the like in the case of an amount of consumed ink), although omitted in FIG. 7, is stored as the operation information in the memory 55.

Figure 8:
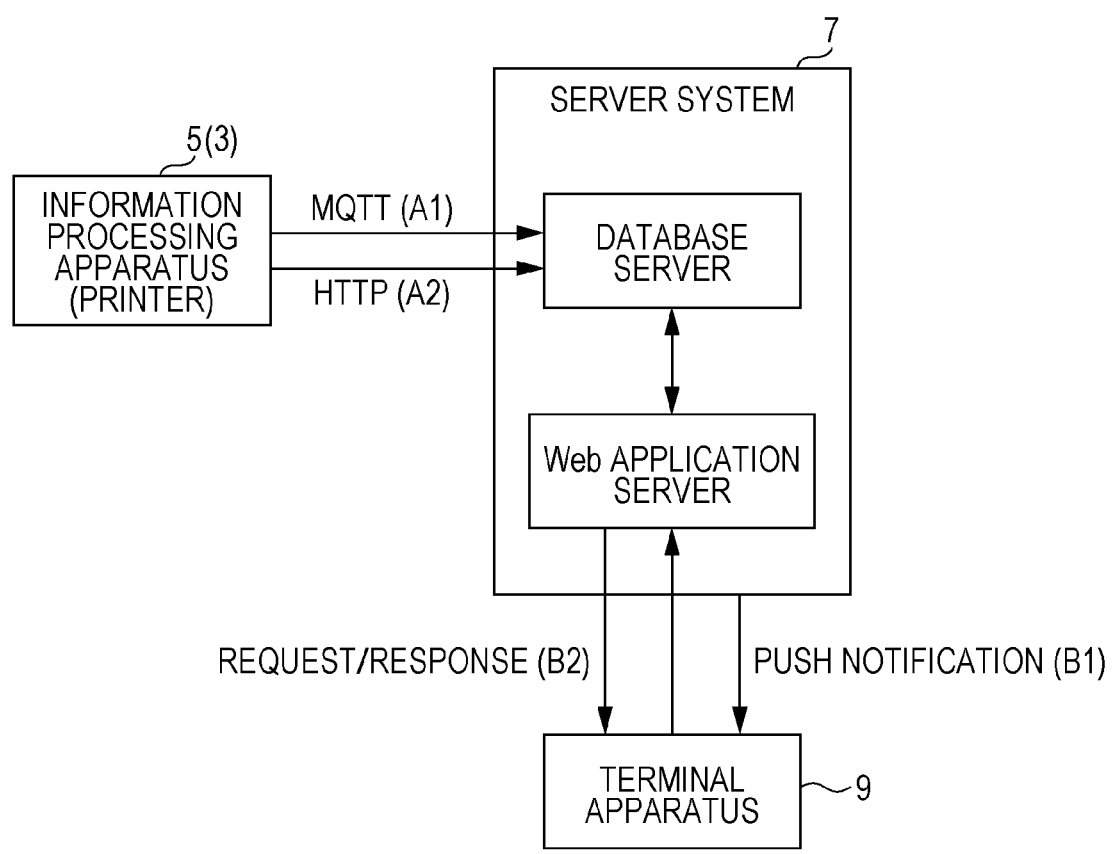
FIG. 8 is a schematic diagram of a communication mode between the information processing apparatus, the server system, and the terminal apparatus.

3.2 Communication Between the Information Processing Apparatus and the Server System FIG. 8 is a diagram that schematically illustrates an aspect of communication between the information processing apparatus 5 (the printer 3), the server system 7, and the terminal apparatus 9. The server system 7 receives the operation information that is transmitted from the information processing apparatus 5, and stores the received operation information in the operation information table of the memory 75. The communication unit 731 of the server system 7 receives the operation information from the information processing apparatus 5 (or directly from the printer 3) by performing a plurality of communication processing operations. For example, the communication unit 731 performs first communication processing that maintains an established state of communication connection after establishment of the communication connection, and second communication processing that releases the communication connection when information is received after the establishment of the communication connection. The first communication processing is communication processing that, for example, uses a message queueing telemetry transport (MQTT), and the second communication processing that, for example, uses a hypertext transfer protocol (HTTP). It is noted that the communication unit 731 (along with the communication unit 531 and the communication unit 931) may realize the first communication processing and the second communication processing through a secure connection that uses a secure sockets layer (SSL) or the like.

The communication unit 731, as indicated by A1 in FIG. 8, receives first information that is the operation information which has a high-real time attribute, by performing the first communication processing. The first information, for example, is information indicating a status (a status change) of the printer 3. In a case where the printer 3 proceeds from a normal operation state (printing in progress) to a warning state or an error state, in order to continue or resume a job (printing), there is a strong need for the user to return to the printer 3 and perform a certain job. The warning state is a state (for example, a state where a remaining amount of ink decreases and so forth) in which there is a concern that the printing will not be continued, and the error state refers to a state where a printing operation is interrupted due to a certain abnormality. Alternatively, in a case where a job is ended in the printer 3 and proceeding from the normal operation state (printing in progress) to an idle state (on standby) takes place, it is possible that the user returns to a place where the printer 3 is installed and then causes the printer 3 to efficiently operate by assigning a new job.

Consequently, a status change from printing in progress to being on standby is also information that has a high-real time attribute.

Consequently, it is desirable that information indicating the status change is transmitted to the server system 7 (and the terminal apparatus 9) as earlier as possible after the status change in the printer 3 occurs. Consequently, in a case where an event indicating the status change occurs, for example, the communication unit 531 (or the communication unit 331 of the printer 3) of the information processing apparatus 5 performs transmission of the operation information, which is triggered by the occurrence of the event (which is caused by an event trigger), to the server system 7 using MQTT.

Specifically, in a case where an event occurs, the communication unit 531 (the communication unit 331) transmits the operation information to the server system 7 immediately (in real time). When this is done, it is possible that the server system 7 suitably receives information that has a high-real time attribute.

FIG. 9 is a specific example of the first information among pieces of operation information, and is a specific example of an event that corresponds to each piece of information. As the first information, in addition to the status information, remaining-time information indicating remaining time to job completion, information, such as a quantity of consumed consumable materials (liquid ink or toner, or a printing medium such as a paper sheet or a piece of cloth) or a remaining amount of consumable material, and information, such as a name of a job that is performed in the printer 3 are considered.

As illustrated in FIG. 9, the status information is a value of any one of "printing in progress," "being on standby," "being in a warning state," and "being in error." "Printing in progress" corresponds to the normal operation state described above, "being on standby" corresponds to the idle state, "warning in progress" corresponds to a warning state, and "being in error" corresponds to an error state. Then, an event that triggers the transmission of the status information to the server system 7 is an event in which a value of the status information changes. It is noted that pieces of equipment, that is, the printer 3, the information processing apparatus 5, and the server system 7 may be managed with transitioning to "warning in progress" or "being in error" and transitioning to "printing in progress," or "being on standby" being separated as different events. While the former is an event indicating an abnormal state where operation of the printer 3 stops or where there is a concern that the operation of the printer 3 will stop, the latter is an event indicating a starting point or an ending point in normal operations such as printing starting and ending.

The remaining-time information is information indicating remaining time to printing completion, and for example, is information indicating remaining hours and minutes. Instead of the remaining-time information, printing completion time information indicating a printing completion time may be set to be first information. The event that triggers the transmission of the remaining-time information to the server system 7 is an event in which the remaining-time information changes. For example, in a case where a flushing operation occurs while the printing is in progress and where the remaining time increases, the printer 3 or the information processing apparatus 5 determines that an event occurs.

The information that is the remaining quantity of consumable materials is a remaining quantity of printing media. The remaining amount of ink is a ratio of a remaining amount to a full capacity of an ink tank which is assumed to be 100%, and a unit of the remaining amount is a percentage. The remaining quantity of printing media may be, for example, the number of sheets, and, in a case where a rolled sheet or the like is used, may be a length (unit: m). An event that triggers transmission of the information that is the remaining quantity of consumable materials to the server system 7 may be an event in which the remaining quantity changes by only a prescribed quantity (a prescribed ratio, a prescribed number of sheets, or a prescribed length), and may be an event in which the remaining quantity falls below a given threshold. Furthermore, as the information on the consumable material, information that is a quantity of consumed materials may be used instead of the remaining-quantity information.

The information that is the job name is a file name (an image file name or the like) that is a printing target. An event that triggers transmission of the job name to the server system 7 is an event indicating performance of a new job. It is noted that an event indicating the performance of a new job may be managed, as an event that is the same as an event (a printing starting event) indicating the transitioning from "being on standby" to "printing in progress," in the printer 3 or the like. Furthermore, the job name is not limited to the name of the job that is being performed. It is also possible that the job names extensively include job names (job history information) of jobs of which the number is prescribed, which were performed in the past.

It is noted that the communication unit 531 (the communication unit 331) may reduce the number of transmissions of information to the server system 7, depending on a type of first information. Specifically, the communication unit 531 does not perform the transmission of the information although a new event occurs for a prescribed period of time (for example, for several minutes), after the previous information is transmitted. When this is done, it is possible that a communication load between the information processing apparatus 5 (the printer 3) and the server system 7 is reduced. For example, the communication unit 731 of the server system 7 transmits particularly status information that has a real-time attribute, among pieces of first information, immediately after an event occurs, and imposes an upper limit on the frequency with which the other pieces of information are received.

In contrast to the first information described above, the second information, which results from counting the number of rotations of a roller of the printing unit 35, the number of times that a header reciprocates, the number of times that cleaning is performed, or the like, is useful in terms of long-term maintenance of the printer 3, but there is a weak need for the user to browse through the second information within several minutes after counting-up is performed. Consequently, the communication unit 731 of the server system 7, as indicated by A2 in FIG. 8, receives the second information from the information processing apparatus 5 using HTTP or the like. Then, the reception of the second information using HTTP is performed less frequently (for example, approximately several times per day) than the first information.

3.3 Communication Between the Server System and the Terminal Apparatus

A plurality of paths for communication between the server system 7 and the terminal apparatus 9 are considered. As indicated by B1 in FIG. 8, the communication unit 731 of the server system 7 performs the push notification on the terminal apparatus 9, and the terminal apparatus 9 performs the reception of the push notification by the communication unit 931 and reporting (rumbling) by the reporting unit 934. In other words, the push notification is communication processing that transmits the operation information, which is performed at the initiative of the server system 7 side.

The information, the push notification of which is performed, is information that has a high-real time attribute, among pieces of first information. Specifically, among the pieces of information described above, with the push notification, a change in the status information is transmitted to the terminal apparatus 9. It is noted that the information that is transmitted with the push notification is post-change status information itself. Alternatively, only the information (for example, "occurrence of an error," or the like) indicating that the change in the status information occurs may be transmitted with the push notification, and specific status information may be transmitted through communication that is indicated by B2, which will be described above.

It is noted that, based on the report setting information table in the memory 75, the server system 7 (the processor 71) determines whether or not to perform the push notification on the terminal apparatus 9. A report setting table, for example, is information that results from associating identification information on the terminal apparatus 9, the identification information on the printer 3 that is a target for report, a time span during which reporting is possible, and a day of the week on which reporting is possible with each other. When this is done, it is possible that the server system 7 performs the push notification of suitable information to the user at a suitable timing. For example, in a case where a company to which a certain user belongs has a plurality of printers 3, control is possibly performed in such a manner that the processor 71 (the communication unit 731) limitedly performs the push notification of only information on a printer of which the certain user is in charge or in such a manner that the processor 71 does not perform outside working hours for the certain user.

When compared with the status information, it is difficult for a problem to occur, although an aspect is that the remaining-time information, the information that is the remaining quantity of consumed consumable materials, and the job name, which have low priority, are received in a case where there is a request from the user (from the terminal apparatus 9).

Consequently, as indicated by B2 in FIG. 8, the communication unit 931 of the terminal apparatus 9 transmits a request to the server system 7 (a Web application server), and the server system 7 replies with the operation information as a response to the request. This communication is performed using, for example, HTTP, and is performed at the time of activation of an application software (a so-called smartphone application) in the terminal apparatus 9, or at the time of an update operation by the user. In other words, the communication for the request/response that is indicated by B2 is communication processing that acquires the operation information, which is performed at the initiative of the terminal apparatus 9 side (the user side).

In the communication that is indicated by B2, the terminal apparatus 9 receives the first information described above from the server system 7. When this is done, it is possible that information which is useful for remote monitoring of the printer 3, which uses the terminal apparatus 9, is presented to the user. It is noted that the communication unit 731 of the server system 7 does not need to reply with all pieces of first information described above, and may reply with one or several pieces of the information. For example, in a case where only one or several pieces of information that are display targets are requested at the request of the terminal apparatus 9, the communication unit 731 of the server system 7 replies with only the information that is requested.

Furthermore, in a case where the request from the terminal apparatus 9 is present, in the communication that is indicated by B2, the communication unit 731 of the server system 7 is not prevented from replying with the second information as a response.

4. Push Notification and Report Control

Next, the push notification from the server system 7 to the terminal apparatus 9 and report control in the terminal apparatus 9, which is based on the push notification, will be described.

4.1 First Embodiment

As indicated by A1 and B1 in FIG. 8, in a case where a given event occurs in the printer 3, operation information associated with the event is collected with more frequency (in real time) in the server system 7, and the push notification from the server system 7 to the terminal apparatus 9 is performed. The event here, for example, is an event in which a status changes, and is a transition to an "error," or a "warning." Furthermore, the events here include an event in which the printing operation ends, which is a transition to "being on standby," and the like.

In a case where the communication unit 931 receives the push notification, the processor 91 of the terminal apparatus 9 performs reporting in the reporting unit 934. Specifically, the processor 91 performs reporting that uses audio from a speaker and reporting that uses vibration by a vibration unit (this report mode is hereinafter expressed as rumbling). In a case where the user does not operate the terminal apparatus 9, the terminal apparatus 9 is caused to make a rumbling sound, and thus it is possible that the occurrence of the event in the printer 3 is suitably reported to the user. Furthermore, in a case where the push notification is received, the processor 91 displays the received information on the display unit 933.

Figure 10:
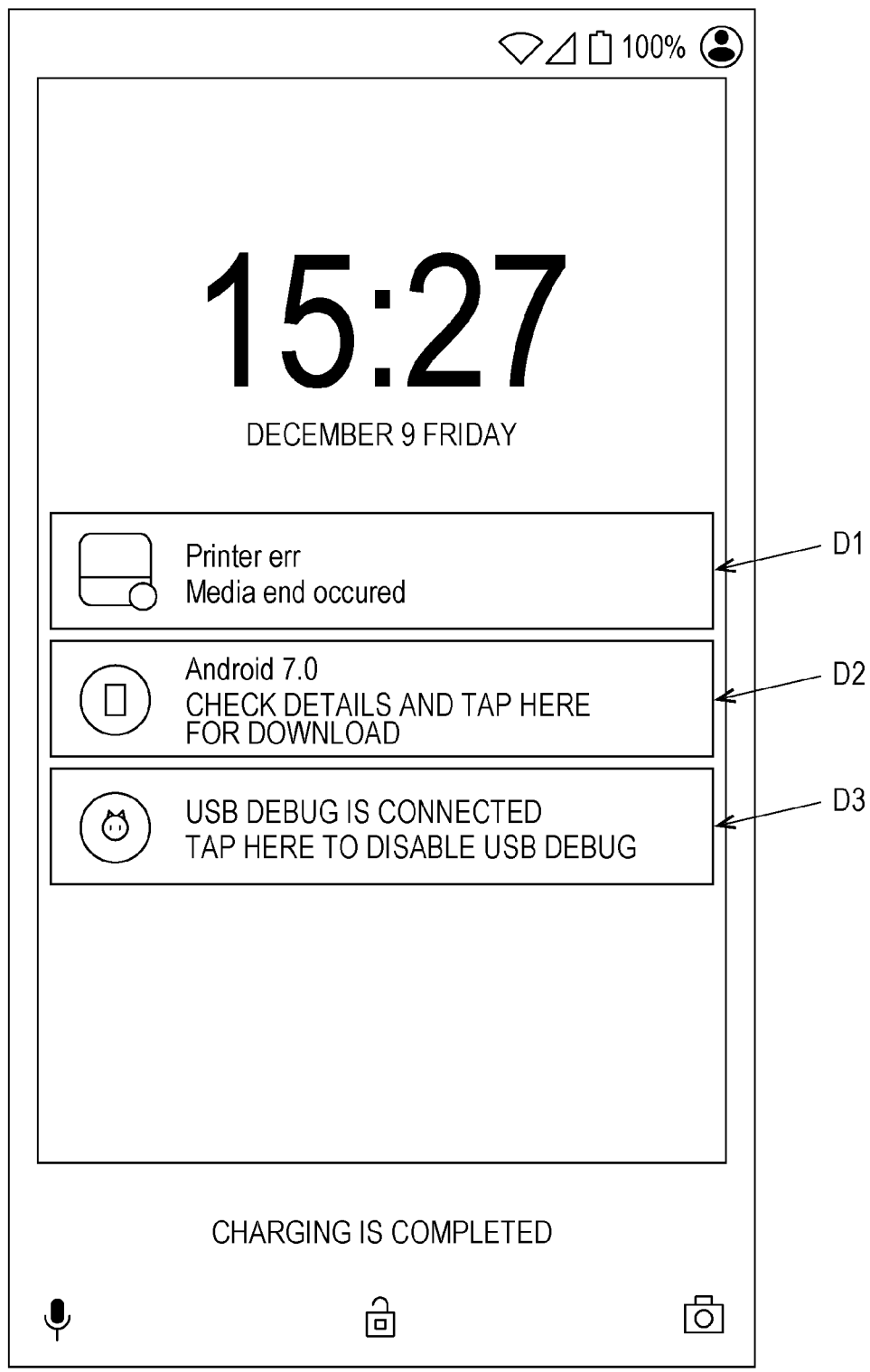
FIG. 10 is an example of a display screen of the terminal apparatus in a case where a push notification is received.

FIG. 10 is an example in which, in a case where the push notification is received, the received information is displayed on the display unit 933 of the terminal apparatus 9. FIG. 10 is an example of a notification of an operating system (OS) of a portable terminal apparatus (a smartphone), more specifically, an example of a notification of Android (a registered trademark) on a log screen in a case where the portable terminal apparatus is used as the terminal apparatus 9. In an example that is indicated by D1 in FIG. 10, the communication unit 931 of the terminal apparatus 9 receives the push notification that an error in which a printing medium is not available occurs, and the processor 91 (an OS in a narrow sense) of the terminal apparatus 9 displays the detail of the push notification on the display unit 933. It is noted that, as indicated by D2 or D3, another notification from the OS, or a notification by another piece of application software may be displayed on the display unit 933. By performing the display that is indicated by D1 in FIG. 10, it is possible that the simple detail of an event is reported to the user.

However, because reporting that uses rumbling receives the attention of the user, it is not preferable that reporting is performed in an unnecessary situation. For example, in a case where a company to which the user belongs retains many printers 3, it is considered that a certain user is in charge of several printers 3 among the many printers 3 and is not in charge of the other printers 3. In this case, the push notification to the terminal apparatus 9 of the certain user that an error occurs in the printer 3 of which the user is not in charge is not useful, and the user feels this annoying.

Furthermore, in a case where a working-in-shifts system is adopted, it is considered that a user A in charge of a given printer 3 is a user A from Monday through Saturday and that the user A is off duty from Saturday through Sunday and a person in charge of the given printer 3 is a user B. In a case where an error occurs on Saturday or Sunday in the prescribed printer 3, the push notification has to be preferentially performed on a terminal apparatus 9 of the user B and the push notification to the terminal apparatus 9 of the user A does not have high priority. Rather, when the push notification is performed, there is a concern that the user A will feel this annoying.

Consequently, in a case where an event occurs in a given printer 3, the server system 7 according to the present embodiment determines whether or not the push notification is performed, according to the terminal apparatus 9. Specifically, the server system 7 is a server system that collects operation information on at least one printer 3 through the network NE1 or NE2, and includes communication unit 731 that transmits report information for the operation information to the terminal apparatus 9, and a processor 71 that performs communication control of the communication unit 731. The processor 71 performs control that transmits the report information which is based on a report setting for a first terminal apparatus, on the first terminal apparatus, and performs control that transmits the report information which is based on a report setting for a second terminal apparatus, on the second terminal apparatus that is different from the first terminal apparatus.

The report information here is information for reporting the operation information on the printer 3 to the user of the terminal apparatus 9. The report information is information that is transmitted as the push notification in a narrow sense, and more specifically, information indicating that a given event occurs in the printer 3.

When this is done, it is possible that, in the system that performs collection of the operation information, the transmission of the report information is performed in a suitable mode for every terminal apparatus 9. If, in the server system 7 of the operation information collection system 1, a duration during which the printer 3 operates is reached, regardless of whether or not the user of the terminal apparatus 9 actively operates the terminal apparatus 9, it is assumed that the collection of the operation information is performed. In other words, in the operation information collection system 1, there is a likelihood that the push notification will occur regardless of whether or not the user is in a situation where there is no problem although the user receives the push notification. In this respect, there is a major difference from JP-A-2015-108940.

At this point, the report setting described above is at least one of a setting of a report time span and a setting specifying which of at least one or more printers, the operation information of which are targets for collection is set to be a target of report. The report time span here includes at least one of information that determines a day of the week which is a time span, and information that determines a time span (for example, a time span in the range of 24 hours from 0:00 to 23:59) in one day.

When this is done, the push notification from the server system 7 to the terminal apparatus 9 is limitedly performed only during a prescribed report time span. For this reason, the push notification can be suppressed during a time span (for example, on an off-duty day or in the middle of the night). Furthermore, in a case where a company to which the user belongs has a plurality of printers 3, a target for the push notification can be limited to a printer 3 (whose management the user is in charge of, for example) associated with the user. For this reason, information that represents low priority to the user, like information indicating the occurrence of an event in the printer 3 of which the user is not in charge, can be suppressed from being push-notified.

Furthermore, the report settings described include a setting of a type of event in the printer 3. For example, in examples in which the push notification, which is triggered by any of the following events: occurrence of an error (a status change to an "error"), occurrence of a warning (a status change to a "warning"), and print ending (a status change to "being on standby"), is possible, a setting as to whether or not reporting is performed on each event is given as a report setting.

When this is done, it is possible that the operation information (an event) that represents great interest to the user is a target for the push notification. For example, in the case of a user who supplies ink or a printing medium as his/her main task, a warning event due to a decrease in a remaining amount of ink or an error event due to an ink shortage has relatively great importance. On the other hand, in the case of a use who performs assignment (for example, running of raster image processor (RIP) software) of a job to the printer 3, which uses a PC or the like, as a his/her main task, a print ending event in which a printer waiting for job assignment has relatively great importance. Alternatively, whether or not a problem is that a job which has been assigned is not completed, or whether or not a problem is that the printer 3 is in a standby state without being assigned a new job depends on types of products that are produced with the printer 3 and production volume, the number of printers that are retained by a company, or the like. If a problem is that a job which has been assigned is not completed, the error event or the warning event increases in importance. If a problem is that the printer 3 is left on standby, the print ending event increases in importance. If the type of event is set as a report setting, the report in accordance with the importance of the event as described above is possible.

However, as understood from the example described above, the report setting suitable for each terminal apparatus 9 varies depending on a user who uses the terminal apparatus 9, and is not easy to automatically perform on the server system 7 side. Accordingly, it is desirable that the report setting described above is given based on report setting information that is received by the server system 7 from the terminal apparatus 9.

Figure 11:
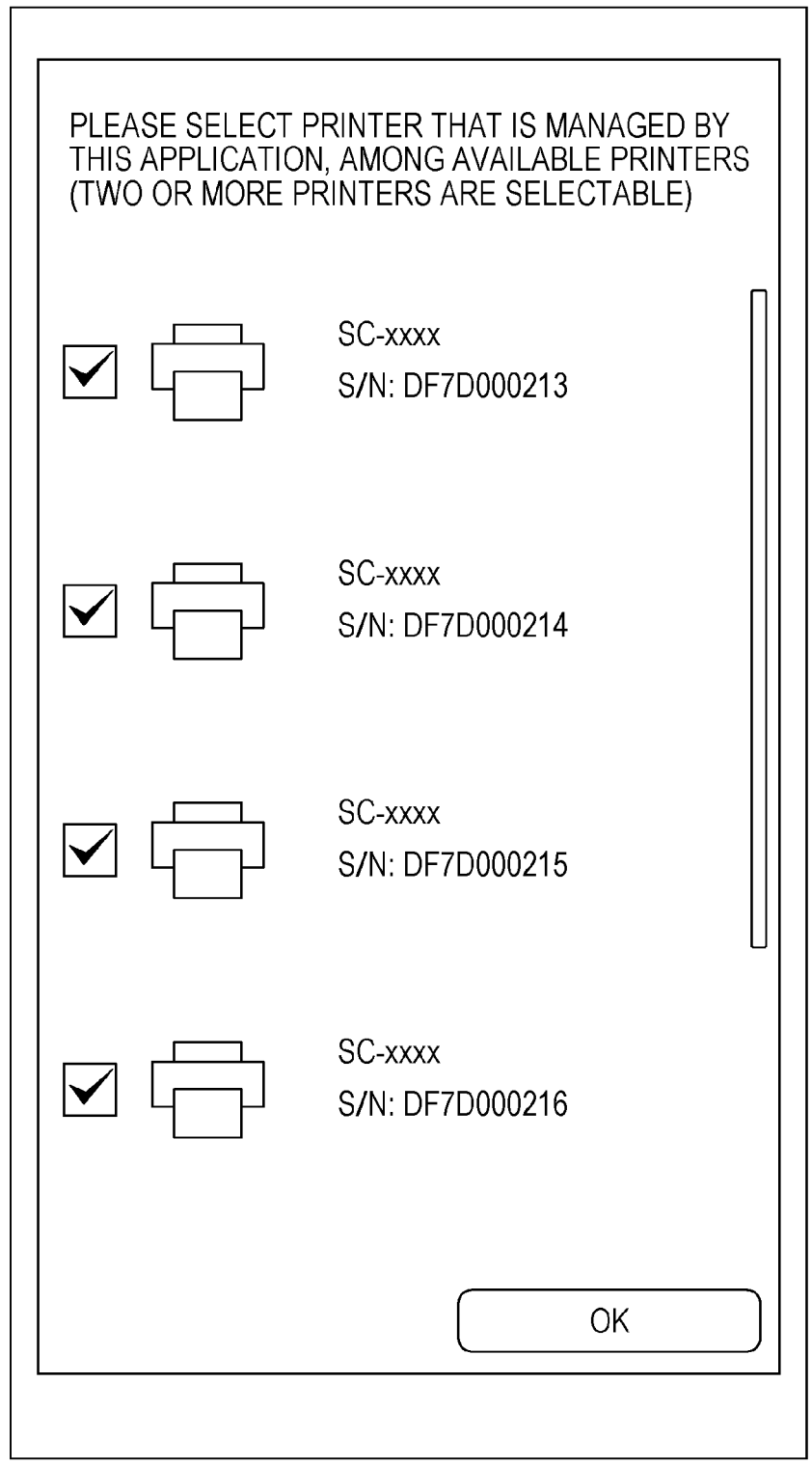
FIG. 11 is an example of the display screen that is used for report setting.

FIGS. 11 and 12 are examples of a screen that is displayed on the display unit 933 of the terminal apparatus 9 when the report setting information is input. FIG. 11 is an example of a display screen through which information that specifies the printer 3 that is a target for report in the terminal apparatus 9 is input as the report setting information.

The communication unit 731 of the server system 7 transmits information on a report candidate printer that is the printer 3 which is a candidate for report in the terminal apparatus 9, to the terminal apparatus 9. For example, in a case where the server system 7 collects pieces of operation information on the printers 3 that a plurality of companies that include a company A and a company B retain, for the purpose of security, it is improper for a user who is an employee of the company A to be allowed to browse through the operation information on the printer 3 of the company B. Consequently, among the printers 3, pieces of operation information on which the server system 7 collects, the server system 7 transmits only the operation information on a prescribed printer 3 to the terminal apparatus 9. Specifically, the report candidate printer for the terminal apparatus 9 of the employee of the company A is the printer 3 that the company A retains.

Consequently, when the printer 3 that is a target for report is selected as (is limited to) a report setting, the report candidate printer is presented from the server system 7 side. When this is done, an unsuitable printer 3 can be suppressed from being a target for report.

Furthermore, as illustrated in FIG. 11, the printers 3 that are candidates are presented, and thus it is possible that an interface that is easier to use than in a case where the user is requested to input identification information (a printer name, a printer serial number, or the like).

For example, as illustrated in FIG. 11, the processor 91 of the terminal apparatus 9 performs processing that displays only pieces of information (serial numbers, names, or the like) on the printers 3 that are candidates for targets for report, which are received from the server system 7, and check boxes side by side. The user marks the check box for the printer 3 that is desired to be set as a target for report, and pushes down an OK button.

Based on the operation described above, among report candidate printers, the communication unit 731 of the server system 7 receives, as the report setting information, information that specifies the printer 3 that is selected as a target for report in the terminal apparatus 9, from the terminal apparatus 9 (the communication unit 931).

Furthermore, FIG. 12 is an example of the display screen through which a day (E1) of the week on which reporting is performed, a time span (E2), and a type (E3) of event are input as the report setting information. As indicated by E1, the processor 91 displays text and a check box for each of Monday, Tuesday, Wednesday, Thursday, Friday, Saturday, and Sunday. The user performs setting of a day of the week by marking the check box for a day of the week on which reporting is allowed. Furthermore, as indicated by E2, the processor 91 displays a text box for starting time input, and a text box for ending time input. The user inputs the starting time (hour and minute) and the ending time for a time span during which reporting is allowed are input and thus performs time span setting. Furthermore, as indicated by E3, the processor 91 displays text and a check box indicating each of the events that are the error event, the warning event, and the print ending event. The user marks a check box for an event that is a target for report, and thus performs event type setting. A day of the week, a time span, and a type of event are input and then the OK button is pushed down. Thus, the communication unit 731 of the server system 7 receives the report setting information that includes the report time span and the type of event, from the terminal apparatus 9 (the communication unit 931).

Based on the report setting information that is received by the communication unit 731 from the terminal apparatus 9, the processor 71 of the server system 7 updates database that results from associating the identification information on the terminal apparatus 9 and the printer 3 that is selected as a target for report, with each other.

Figures 13, 14, 15:
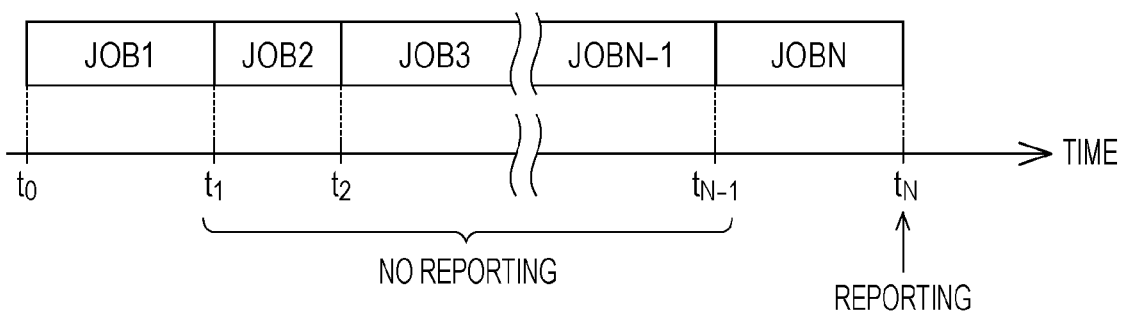
FIG. 13 is an example of a report setting information table.
FIG. 14 is an example of the report setting information table.
FIG. 15 is a schematic diagram for describing the push notification in a case where consecutive jobs are performed.

FIGS. 13 and 14 are examples (examples of a configuration of the report setting information table in FIG. 4) of a data structure of the report setting information that is stored in the memory 75 of the server system 7. As illustrated in FIG. 13, the report setting information table has a table in which the identification information on the printer 3 and the identification information on the terminal apparatus 9 are associated with each other. The identification information on the printer 3, for example, a printer serial number, but other information may be used. As the identification information on the terminal apparatus 9, various pieces of information can be used such as an ID number, a name, and a MAC address. In the example in FIG. 13, two terminal apparatuses 9 that are expressed by "mobile_id1," and "mobile_id2 are associated with a printer 3 that is expressed as "id1." Furthermore, a terminal apparatus 9 that is expressed as "mobile_id2" is associated with a printer 3 that is expressed as "id2." As understood from the example, it is possible that a plurality of printers 3 are targets for report in one terminal apparatus 9. Furthermore, it is also possible that reporting on one printer 3 is performed in the plurality of terminal apparatuses 9.

Furthermore, as illustrated in FIG. 14, the report setting information table has a table in which the identification information on the terminal apparatus 9, and the report time span in the terminal apparatus 9 and the type of event are associated with each other. In the example in FIG. 14, information on setting of the day of the week that is expressed as "day_config1," information on the time span setting that is expressed as "time_config1," and information on the event type setting that is expressed as "event_config1" are associated with the terminal apparatus 9 that is expressed as "mobile_id1." day_config1, for example, is information that results from associating whether or not to perform reporting with each day of the week. time_config1, for example, is information that indicates the starting time and the ending time. event_config1, for example, is information that results from associating whether or not to perform reporting with each of the error event, the warning event, and the print ending event.

It is possible that, with reference to FIGS. 13 and 14, the transmission (the push notification) of suitable report information to the terminal apparatus 9 is performed. For example, in a case where an event that corresponds to "event_config1" occurs in the printer 3 that is expressed as "id1" and where reporting is set to be available on a day of the week that is "day_config1" and during a time span that is "time_config1" the processor 71 of the server system 7 performs communication control that performs the push notification to the terminal apparatus 9 which is expressed as "mobile_id1."

It is noted that the data structure of the report setting information table is not limited to FIGS. 13 and 14, and that various modifications are possible. Furthermore, various modifications to a specific structure (a type of data, the number of bits, or the like) of each piece of data, such as id1 or day_config1 are possible.

4.2 Second Embodiment

In the first embodiment, the printer 3 that is a target for report, the report time span (a day of the week and time), and the type of event are determined on the server system 7 side. For this reason, in the terminal apparatus 9 according to the first embodiment, complicate report control is unnecessary, and for example, in a case where the push notification is performed, the processor 91 necessarily causes the reporting unit 934 to make a rumbling sound. In other words, a technique in which the number of times that unnecessary push notification is performed is narrowed down on the server system 7 side and thus, unnecessary reporting to the user is suppressed is according to the first embodiment.

However, in the terminal apparatus 9, it is possible that the reception of the push notification and the reporting that uses the reporting unit 934 are performed as different processing operations. Consequently, in the present embodiment, in a case where the push notification is received, according to the detail of the push notification, the processor 91 of the terminal apparatus 9 determines whether or not to perform reporting (to make a rumbling sound), and thus suppressed the unnecessary reporting.

That is, a technique according to the present embodiment can apply to a terminal apparatus 9 that is communicatively connected to a server system 7 that collects operation information on at least one printer 3, through a network NE2, the terminal apparatus 9 including a communication unit 931 that receives report information for the operation information through the network NE2, and a processor 91 that performs report control that is based on the report information. A processor 91 of the terminal apparatus 9 performs report control of report information in a first report mode at the time of a first report setting, and performs the report control of the report information in a second report mode, which is different from the first report mode, at the time of a second report setting.

When this is done, in a case where the report information (push notification) is received from the server system 7, it is possible that the detail of the report control is changed according to the report setting on the terminal apparatus 9 side. The report setting here, for example, is the same as in the first embodiment, and includes at least one of a printer 3 that is a target for report, a report time span, and a type of event.

Furthermore, at this point, a difference between the report modes means that whether or not to make a rumbling sound depends on the printer 3, the report time span, and the type of event in a narrow sense. However, a specific detail of the rumbling as the report mode may be changed, and it is also possible that, according to the printer 3, the report time span, and the type of event, one of audio and vibration is caused to be generated or a pattern of the sound or the vibration is changed.

The report setting information indicating the report setting is stored in the memory 95 of the terminal apparatus 9. It is possible that, for the report setting information, the same data structure as in FIGS. 13 and 14 is used, but in a given terminal apparatus 9, in most situations, a report setting information on another terminal apparatus 9 does not need to be stored or does not have to be stored from the perspective of security. Consequently, only information in a record associated with a given terminal apparatus 9, of the table that is illustrated in FIGS. 13 and 14, is stored in the memory 95 of the given terminal apparatus 9. In the case of the terminal apparatus 9 that is expressed as "mobile_id2," "id1" and "id2" that are pieces of identification information on the printer 3 that is a target for report, "day_config2" that is a setting of a day of the week, "time_config2" that is a setting of a time span, and "event_config2" that is a setting of a type of event are stored in the memory 95.

When this is done, in a case where the push notification from the server system 7 to the terminal apparatus 9 is performed, report in the terminal apparatus 9 is limitedly performed only according to a prescribed printer 3, a prescribed report time span, and a prescribed type of event. For this reason, report relating to the printer 3 that is not a target for management by the user, report during a time span (for example, on an off-duty day or in the middle of the night)

during which the user does not desire to hear a rumbling sound, or report relating to an event that has less importance can be suppressed.

In a case where the first embodiment and the second embodiment are compared, because the number of times that the push notification is performed is small in the first embodiment, the first embodiment has an advantage in that the load on a network is possibly reduced. On the other hand, because the determination in the server system 7 is unnecessary in the second embodiment, the configuration of the server system 7 can be simplified. Moreover, if each terminal apparatus 9 individually stores the report setting information, this is satisfactory. Thus, the report setting information table that is stored in the memory 75 of the server system 7 does not need to be rewritten base on the information from the terminal apparatus 9. Specifically, in the second embodiment, an application programming interface (API) for update of the report setting information table is unnecessary. Furthermore, in the second embodiment, the report setting information is not transmitted to the server system 7. Because of this, the terminal apparatus 9 does not need to be connected to the network NE2 at a timing at which the report setting that uses the screen in FIGS. 11 and 12 is performed.

Furthermore, in the second embodiment, the push notification itself is received. Because of this, the processor 91 does not make a rumbling sound using the reporting unit 934, but it is also possible that the display (for example, OS notification of the terminal apparatus 9 as illustrated in FIG. 10) on the display unit 933 is performed. Alternatively, a modification is also possible in which, when the report time span comes, the processor 91 performs report of the push notifications that are received at a time other than during the report time span, collectively, using the reporting unit 934. When this is done, it is possible that the presence of the push notifications are reported to the user while suppressing the rumbling sound that the user does not desire to hear.

4.3 Modification Examples

Several modification examples will be described below.

In the first embodiment, the technique is described which determines whether or not the push notification is performed on the server system 7 side, and in the second embodiment, the technique is described which determined whether or not report (rumbling) is performed on the terminal apparatus 9 side.

However, the report control is not limited to this, and may be performed with the server system 7 and the terminal apparatus 9 working in conjunction with each other. Specifically, the report setting is a setting specifying which of at least one or more printers 3, the operation information on which are targets for collection, is a target for report. In a case where a report event occurs in the printer 3 that is a target for report, the communication unit 731 of the server system 7 transmits the report information (the push notification) to the terminal apparatus 9 without depending on the time span and the type of event. On this occasion, in the server system 7, the setting of the report time span and the setting of the type of event may be retained as the report setting. Then, the processor 91 of the terminal apparatus 9 determines whether or not a reception time span for the push notification and the type of event that is indicated by the push notification are consistent with the time span and the type of event, respectively, that are set in advance. If so, the processor 91 performs reporting using the reporting unit 934. If not, the processor 91 does not perform reporting.

When this is done, it is possible that an association between the printer 3 and the terminal apparatus 9 is managed on the server system 7 side, and that the time span and the type of event are managed on the terminal apparatus 9 side. For this reason, it is possible that a network load is reduced when compared with the first embodiment, the configuration of the server system 7 is simplified when compared with the second embodiment, and so forth. Furthermore, in the present modification example, in the same manner as in the second embodiment, it is possible that the display on the display unit 933 is performed without causing the reporting unit 934 to make a rumbling sound, and that, when the report time span comes, the push notifications that are received at a time other than during the report time span are reported collectively.

Furthermore, the example in which the print ending event is used as an event that is a target for the push notification is described above. The print ending is reported, and thus, it is possible that the printer 3 is suppressed from being left on standby as is. However, it is also possible that a plurality of jobs are assigned collectively with a printer driver (RIP). For example, in a case where pieces of information on a plurality of jobs are retained and where a notification that the printer 3 ends a given job and proceeds to a standby state is provided, the printer driver instructs the printer 3 to perform the next job. In this case, although the print ending event occurs, because the next printing operation is immediately started, the printer 3 is not left on standby as is.

FIG. 15 is a schematic diagram for describing an example in which a plurality of jobs are consecutively performed. The vertical axis in FIG. 15 represents time, and a job 1 to a job N indicate N jobs that are consecutively performed. It is noted that there is a likelihood that the standby state that is extremely short in time between jobs will be entered, but that this is omitted from FIG. 15.

In a case where, among first to N-th jobs that are to be consecutively performed in the printer 3, the N-th job is ended, the communication unit 931 of the server system 7 transmits the report information to the terminal apparatus 9. More specifically, among the jobs that are to be consecutively performed, the N-th job corresponds to the last job. In the case of the example in FIG. 15, $t_1$ to $t_{N-1}$ correspond to timings, respectively, at which events in which a job 1 to a job N−1 end occur, but the communication unit 931 does not perform the transmission (the push notification) of the report information. The reason is because at the timings, $t_1$ to $t_{N-1}$, the next jobs, the job 2 to the job N, are scheduled to start and thus reporting rarely need to be performed for the user. Then, the communication unit 731 transmits the report information at the timing $t_N$. When this is done, it is possible that, while the printer 3 is suppressed from being left on standby as is, the number of times that the push notifications are performed is decreased and the load on the network is reduced.

Furthermore, the push notification and the reporting for the push notification are described above. However, the operation information that is received in the terminal apparatus 9 is not limited to the push notification, and it is possible that other information is received along a path which is indicated by B2 in FIG. 8.

Figure 16:
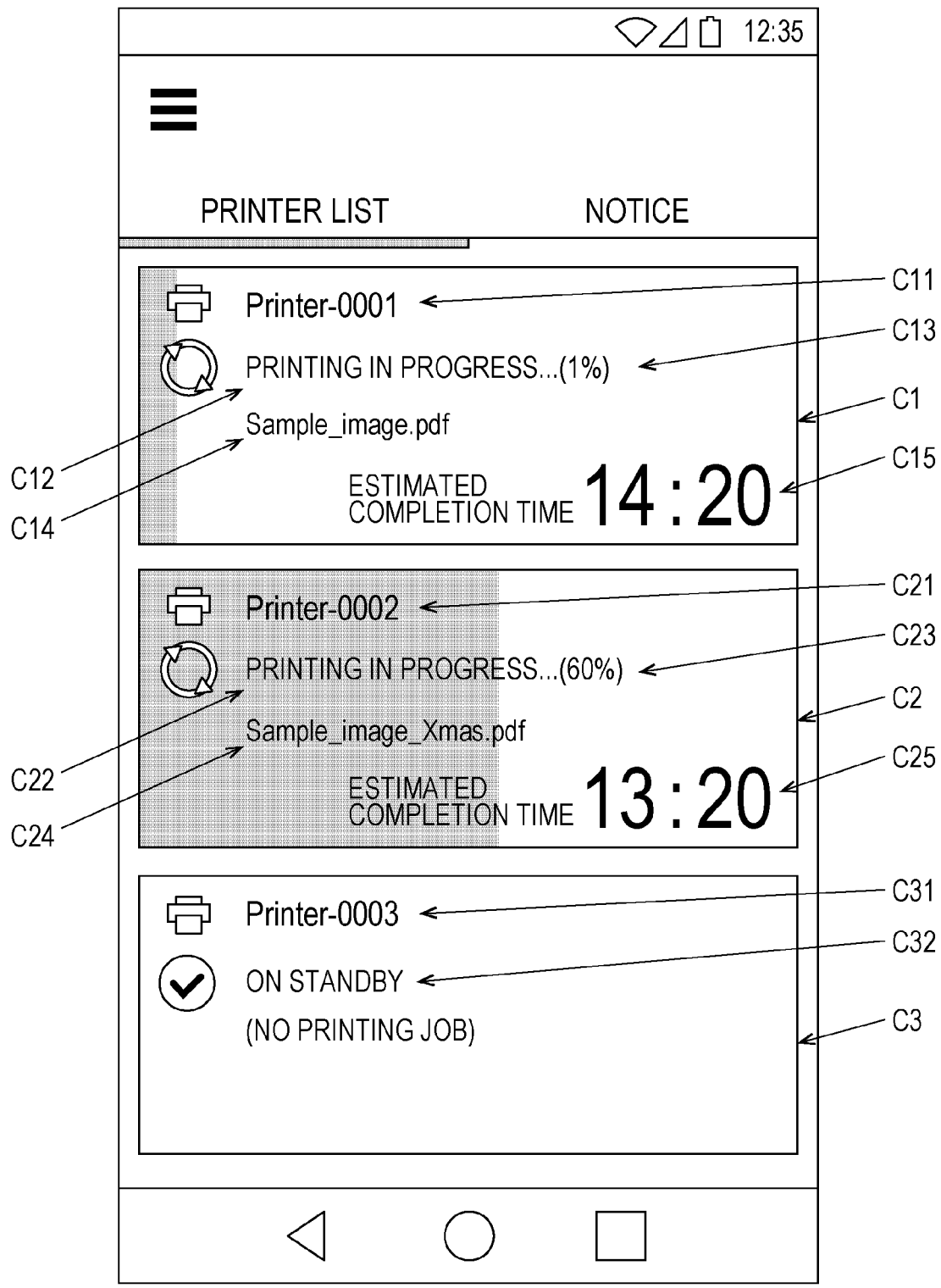
FIG. 16 is an example of the display screen on which a plurality of pieces of information on the printer are list-displayed.

FIG. 16 is an example of the display screen that is displayed on the display unit 933 of the terminal apparatus 9. The communication unit 931 of the terminal apparatus 9 receives pieces of printing time information or the like on a plurality of printers 3, through a network, and the processor 91 performs processing that displays the display screen, within one screen of which the pieces of printing time information or the like on the plurality of printers 3 are arranged, on the display unit 933.

In the example in FIG. 16, pieces of information on three printers are displayed on the display unit 933. For example, along with "Printer-0001" (C11) that is a name of the printer 3, status information (C12) as the operation information, information (C13) on progress in performing a job, a job name (C14), and printing completion time information (C15) are displayed on an area that is indicated by C1. Specifically, a printer that has a name which is "Printer-0001" has a status that is "printing in progress," and performs a job that has a job name which is "Sample_image.pdf." At this point, the job name is a name of a file that is a printing target. Then, when the completion of the job is assumed to be 100%, progress is 1%, and the printing completion time is "14:20."

Furthermore, on an area that is indicated by C2, of the display unit 933, it is shown that a printer that has a name which is "Printer-0002" has a current status that is "printing in progress" and performs a job that has a job name (a printing target file name) which is "Sample_image_X-mas.pdf," that the progress in performing the job is "60%," and that the printing completion time is "13:20."

On an area that is indicated by C3, of the display unit 933, it is shown that a printer that has a name which is "Printer-0003" has a current status which is "being on standby" (an idle state). Because Printer-0003 is in the idle state, the job name, the information on the progress, and the printing completion time information are not displayed.

By using the display screen in FIG. 16, it is possible that operation states of a plurality of printers 3 are presented to the user in a more perspicuous manner. Particularly, because the printing completion time information is displayed, in a case where a plurality of printers 3 are display targets, the printing completion time is also easy to know. For example, on the display screen in FIG. 16, because the earliest printing completion time is easy to know, it is possible that the user is caused to determine that by that time, he/she has to return to a place where the printer 3 is installed and prepare for assignment of a next job.

It is noted that it is possible that pieces of information on a plurality of printers 3 are displayed on the display screens in FIG. 16 in a more perspicuous manner, but that an amount of information for one printer 3 is limited. For example, in FIG. 16, among pieces of first information, information on the remaining amount of ink or history information on the job name are not the display targets. Consequently, when any printer is selected from among a plurality of printers 3, pieces of printing time information on which are displayed, the processor 91 performs processing that enlarges a display area for the printer on which a selection operation is performed and displays detail information.

Figure 17:
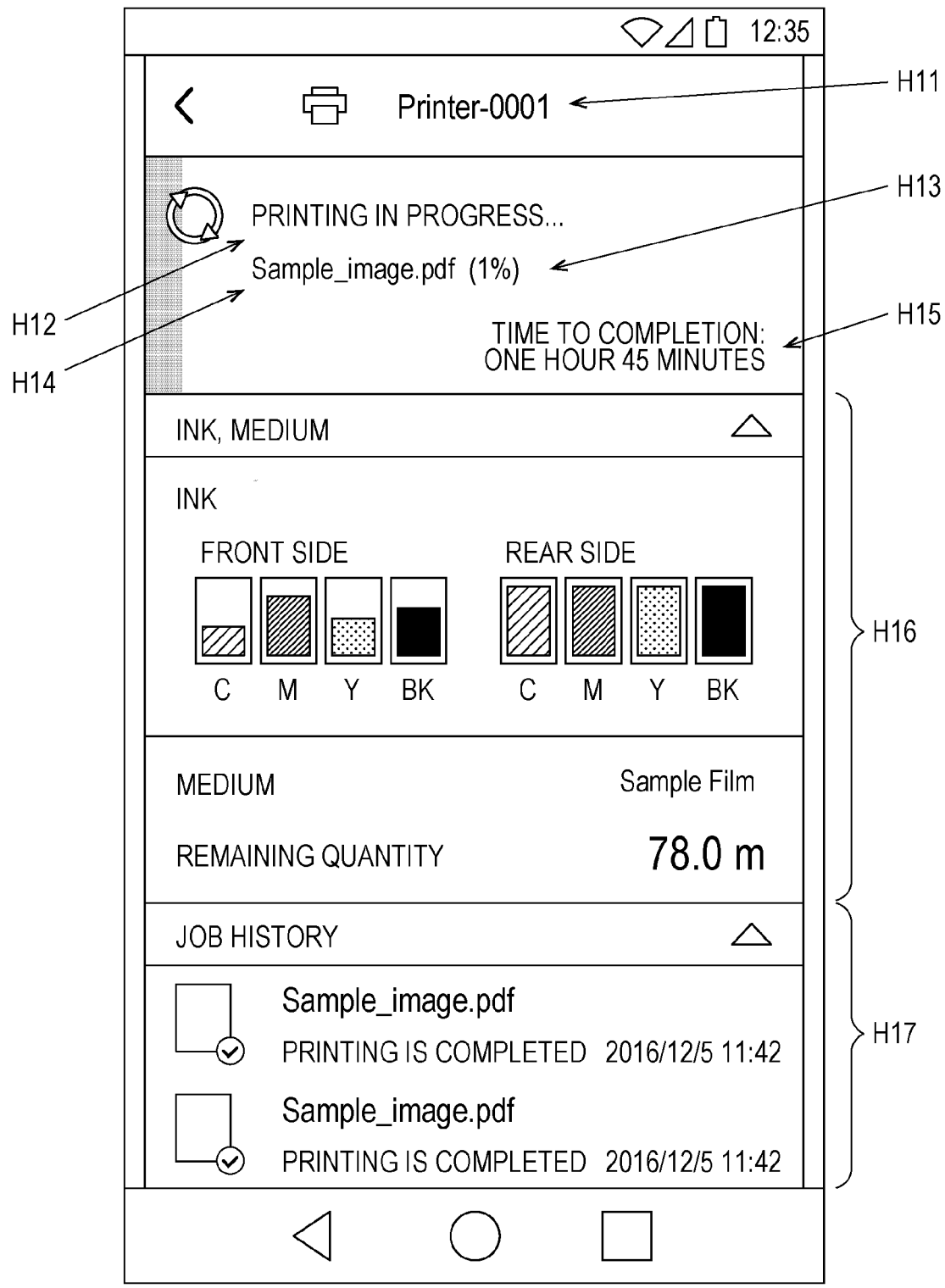
FIG. 17 is an example of the display screen for detail information.

FIG. 17 is an example of the display screen on which the detail information is displayed. FIG. 17 corresponds to the display screen in a case where, for example, in a state where the display in FIG. 16 is performed, the user performs an operation of selecting "Printer-0001." In addition to displays (H11 to H15) of pieces of information that correspond to C11 to C15, respectively, in FIG. 16, the processor 91 displays pieces of information (H16) that are a remaining amount of ink and a remaining quantity of media (paper sheets or pieces of cloth) and job history information (H17). It is noted that in H15, the information that is the remaining time to the printing completion is displayed, but that in the same manner as in C15 in FIG. 16, the printing completion time information may be used.

When this is done, by suitably switching between the more perspicuous display (FIG. 16) and the detail display (FIG. 17), it is possible that suitable information is presented to the user. It is noted that the information which is displayed as the detail information is not limited to FIG. 17 and that various modifications are possible. Furthermore, the example in which the detail information is displayed on a screen that is different from that in FIG. 16 ("Printer-0002," or "Printer-0003" is not illustrated) is illustrated in FIG. 17, but different modifications are also possible. For example, it is also possible that, as illustrated in FIG. 16, the detail information is additionally displayed on a screen on which pieces of information on a plurality of printers 3 are displayed side by side. Specifically, in a case where "Printer-0001" is selected, display that is equivalent to H16 or H17 may be inserted between C1 and C2 in FIG. 16. In this case, although the detail information is being displayed, by performing a scrolling operation, it is possible that other pieces of information such as "Printer-0002" are browsed through.

Furthermore, as illustrated in FIG. 1, a technique according to the present embodiment can apply to an operation information collection system 1 that includes a terminal apparatus 9 and a server system 7, which are described above. Specifically, the operation information collection system 1 includes the server system 7 that collects operation information on at least one printer 3 through a network, and the terminal apparatus 9 that is communicatively connected to the server system 7. The server system 7 includes a first communication unit (a communication unit 731) that transmits report information for the operation information to the terminal apparatus 9, and a first processor (a processor 71) that performs communication control of the first communication unit. The terminal apparatus 9 includes a second communication unit (a communication unit 931) that receives the report information on the operation information from the server system 7, and a second processor (a processor 91) that performs report control which is based on the report information. Then, in the operation information collection system 1, at least one of (1) control by the first processor, which transmits the report information which is based on a report setting for a first terminal apparatus, to the first terminal apparatus and transmits report information that is based on a report setting for a second terminal apparatus that is different from the first terminal apparatus, to the second terminal apparatus and (2) control by the second processor, which performs report control of the report information in a first report mode when a first report setting is applied and performs the report control of the report information in a second report mode that is different from the first report mode, when a second report setting is applied, is performed.

That is, in the operation information collection system 1, push notification may be controlled on the server system 7 side as in the first embodiment, the report control may be controlled on the terminal apparatus 9 side as in the second embodiment, and the control may be realized by a combination of the server system 7 and the terminal apparatus 9 as in the modification example.

Furthermore, one or several of or most of the processing operations by the server system 7, the terminal apparatus 9, or the like according to the present embodiment may be realized by a program. In this case, a processor such as a CPU executes the program, and thus the server system 7, the terminal apparatus 9 or the like according to the present embodiment is realized. Specifically, the program that is stored on a non-transitory information storage medium is read and the processor such as the CPU executes the program that is read. The information storage medium (computer-readable medium) here is one on which a program, data, or the like are stored, and a function thereof can be realized by an optical disk (a DVD, a CD, or the like), a hard disk driver (HDD), a memory (a card-type memory, a ROM, or the like), or the like. Then, the processor such as the CPU performs various processing operations according to the present embodiment based on the program (the data) that is stored in the information storage medium. That is, a program (a program that causes a computer to perform processing by each unit) for causing a computer (an apparatus that includes an operation unit, a processor, a memory, and an output unit) to function as each unit according to the present embodiment is stored in the information storage medium.

Furthermore, the server system 7, the terminal apparatus 9, or the like according to the present embodiment may include a processor and a memory. The processor here, for example, may realize a function of each unit in individual hardware, or may realize the function of each unit in integrated hardware. For example, the processor can include a piece of hardware, and the piece of hardware can include at least one of a circuit that processes a digital signal and a circuit that processes an analog signal. For example, the processor can be configured with one or more circuit devices (for example, an IC or the like) that is mounted on a circuit substrate, or with one or more circuit elements (for example, a resistor, a capacitor, or the like). The processor, for example, may be a CPU. However, the processor is not limited to the CPU, and it is possible that various processors such as a graphics processing unit (GPU) or a digital signal processor (DSP) are used. Furthermore, the processor may be a hardware circuit that is an ASIC. Furthermore, the processor may include an amplification circuit, a filter circuit, or the like that processes an analog signal. The memory may be a semiconductor memory such as a SRAM or a DRAM, may be a resistor, may be a magnetic storage device such as a hard disk device, and may be an optical storage device such as an optical disk. For example, a computer-readable instruction is stored in the memory, and execution of the instruction by the processor realizes a function of each unit (the communication unit or a processor) of the server system 7 or the terminal apparatus 9. The instruction here may be a command in an instruction set that makes up the program, and may be an instruction that instructs a hardware circuit of the processor to perform an operation.

Furthermore, a technique according to the present embodiment can apply to a method of operating a server system 7 that collects operation information on at least one printer 3, through a network, the method of operating the server system 7 that performs processing which transmits report information for the operation information to a terminal apparatus 9 and communication control of the report information, performs control that transmits the report information that is based on a report setting for a first terminal apparatus, to the first terminal apparatus, and performs control that transmits the report information which is based on a report setting for a second terminal apparatus that is different from the first terminal apparatus, to the second terminal apparatus.

Alternatively, a technique according to the present embodiment can apply to a method of operating a terminal apparatus 9 that is communicatively connected to a server system 7 that collects operation information on at least one printer 3, through a network NE2, the method of operating the terminal apparatus 9 that performs processing which receives report information for the operation information through a network NE2, and report control which is based on the report information, performs the report control of the report information in a first report mode when a first report setting is applied, and performs the report control of the report information in a second report mode that is different from the first report mode, when a second report setting is applied.

The embodiments and the modification examples thereof to which the invention is applied are described above, but the invention is not limited to the embodiments and the modification examples thereof as are, and in the stage of implementation, for realization, a change can be made to a constituent element within the scope that does not depart from the gist of the invention. Furthermore, various inventions can be contemplated by suitably combining a plurality of constituent elements that are disclosed in each embodiment or the modification example thereof, which are described above. For example, among all constituent elements that are described in each embodiment or the modification example thereof, several constituent elements may be deleted. Moreover, the constituent elements that are described in the different embodiments and the modification examples thereof may be combined. Furthermore, in the specification or the drawings, the terms that are described at least once together with different terms that have broader meaning or the same meaning can be exchanged with the different terms, in any place of the specification or the drawings. In this manner, various modifications or applications are possible within the scope that does not depart from the gist of the invention.

What is claimed is:
1. A server system that collects operation information on a printer through a network, the system comprising:
   a communication interface that transmits report information for the operation information to a terminal apparatus;
   a memory in which report settings for a plurality of terminal apparatuses are stored, the report settings being received from each of the plurality of terminal apparatuses, the report settings defining at least one day and at least one time span when each respective terminal apparatus in the plurality of terminal apparatuses is to receive corresponding report information, wherein push notifications, which are selectively provided to one or more terminal apparatuses included among the plurality of terminal apparatuses and which include said report information, are limitedly performed only during said at least one day and at least one time span such that the push notifications are suppressed from being pushed to the one or more terminal apparatuses during times outside of said at least one day and at least one time span; and
   a processor that performs communication control by the communication interface,
   wherein the report settings are given based on report setting information that is received from each of at least some terminal apparatus included among the plurality of terminal apparatuses, and
   wherein the processor controls transmission of the report information based on the report settings.
2. The server system according to claim 1, wherein the report settings include a setting specifying a particular printer that is selected as a target for receiving a particular report.

3. The server system according to claim 1, wherein the report settings include a setting of a type of event in the printer.

4. The server system according to claim 1, wherein the communication interface transmits information on a report candidate printer, which is a candidate for receiving a particular report, and receives information specifying that the report candidate printer is selected.

5. The server system according to claim 4, wherein the processor updates a database that results from associated identification information about the report candidate printer, wherein updating the database is based on the report setting information that is received by the communication interface.

6. The server system according to claim 1, wherein the report settings include a setting a particular printer that is selected as a target for receiving a particular report, and
wherein, in a case where a report event occurs in the particular printer, the communication interface transmits the report information to the terminal apparatus without depending on a type of event.

7. The server system according to claim 1, wherein, in a case where among first to N-th jobs that are to be consecutively performed in the printer, the N-th job is completed, the communication interface transmits the report information to the terminal apparatus.

8. A non-transitory computer-readable storage medium on which a program that causes a terminal apparatus which is communicatively connected to a server system that collects operation information on a printer, through a network, is stored, the program causing the terminal apparatus to serve as:
a communication interface that receives report information for the operation information through the network, and
a processor that performs report control which is based on the report information,
wherein the processor controls transmission of the report information based on a report setting for every terminal apparatus included among a plurality of terminal apparatuses, the report setting being received from each of the plurality of terminal apparatuses, the report setting defining at least one day and at least one time span when the terminal apparatus is to receive report information, wherein push notifications, which are selectively provided to one or more terminal apparatuses included among the plurality of terminal apparatuses and which include said report information, are limitedly performed only during said at least one day and at least one time span such that the push notifications are suppressed from being pushed to the one or more terminal apparatuses during times outside of said at least one day and at least one time span.

9. A method of operating a server system that collects operation information on a printer through a network, the method comprising:
performing processing that transmits report information for the operation information to a terminal apparatus, and communication control of the report information;
performing control that transmits the report information based on a report setting for a first terminal apparatus, to the first terminal apparatus, the report setting being received from the first terminal apparatus, the report setting defining at least one day and at least one time span when the first terminal apparatus is to receive report information, wherein push notifications, which are selectively provided to the first terminal apparatus and which include said report information, are limitedly performed only during said at least one day and at least one time span such that the push notifications are suppressed from being pushed to the first terminal apparatus during times outside of said at least one day and at least one time span; and
performing control that transmits the report information based on a report setting for a second terminal apparatus that is different from the first terminal apparatus, to the second terminal apparatus, the report setting of the second terminal apparatus being received from the second terminal apparatus, the report setting of the second terminal apparatus defining at least one day and at least one time span when the second terminal apparatus is to receive corresponding report information.

* * * * *